United States Patent
Zhang et al.

(10) Patent No.: US 10,983,311 B2
(45) Date of Patent: Apr. 20, 2021

(54) CAMERA LENS GROUP

(71) Applicant: ZHEJIANG SUNNY OPTICAL CO., LTD., Ningbo (CN)

(72) Inventors: Kaiyuan Zhang, Ningbo (CN); Ming Li, Ningbo (CN); Bo Song, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 132 days.

(21) Appl. No.: 16/231,150

(22) Filed: Dec. 21, 2018

(65) Prior Publication Data

US 2019/0121102 A1 Apr. 25, 2019

Related U.S. Application Data

(63) Continuation of application No. PCT/CN2018/086745, filed on May 14, 2018.

(30) Foreign Application Priority Data

Sep. 20, 2017 (CN) .......................... 201710857688.9
Sep. 20, 2017 (CN) .......................... 201721207874.X

(51) Int. Cl.
*G02B 13/00* (2006.01)
*G02B 9/64* (2006.01)
*G02B 13/18* (2006.01)

(52) U.S. Cl.
CPC ........... *G02B 13/0045* (2013.01); *G02B 9/64* (2013.01); *G02B 13/18* (2013.01)

(58) Field of Classification Search
CPC ....... G02B 13/18; G02B 9/64; G02B 13/0045
USPC .......................................................... 359/755
See application file for complete search history.

(56) References Cited

U.S. PATENT DOCUMENTS

| 2014/0160580 A1 | 6/2014 | Nishihata et al. |
| 2014/0211324 A1 | 7/2014 | Ishizaka |
| 2016/0025953 A1 | 1/2016 | Jung |
| 2016/0306140 A1* | 10/2016 | Chen .................... G02B 9/62 |

(Continued)

FOREIGN PATENT DOCUMENTS

| CN | 203595858 U | 5/2014 |
| CN | 105278074 A | 1/2016 |
| CN | 105807401 A | 7/2016 |

(Continued)

*Primary Examiner* — Kristina M Deherrera
(74) *Attorney, Agent, or Firm* — Hauptman Ham, LLP

(57) ABSTRACT

The present disclosure discloses a camera lens group. The camera lens group sequentially includes, from an object side to an image side along an optical axis: a first lens, a second lens, a third lens, a fourth lens, a fifth lens, a sixth lens and a seventh lens. The first lens has a positive refractive power and a convex object-side surface. The second lens has a positive refractive power and a convex object-side surface. The third lens has a refractive power and a concave image-side surface. The fourth lens has a refractive power. The fifth lens has a refractive power. The sixth lens has a positive refractive power and a convex image-side surface. The seventh lens has a negative refractive power, and a concave object-side surface and a concave image-side surface. A total effective focal length f and an entrance pupil diameter EPD of the camera lens group satisfy: $f/EPD \leq 1.60$.

18 Claims, 17 Drawing Sheets

(56) References Cited

U.S. PATENT DOCUMENTS

2018/0188484 A1    7/2018   Gong et al.

FOREIGN PATENT DOCUMENTS

| CN | 106842512 | A | 6/2017 |
| CN | 107153257 | A | 9/2017 |
| CN | 107436481 | A | 12/2017 |
| JP | 2015-72402 | A | 4/2015 |

* cited by examiner

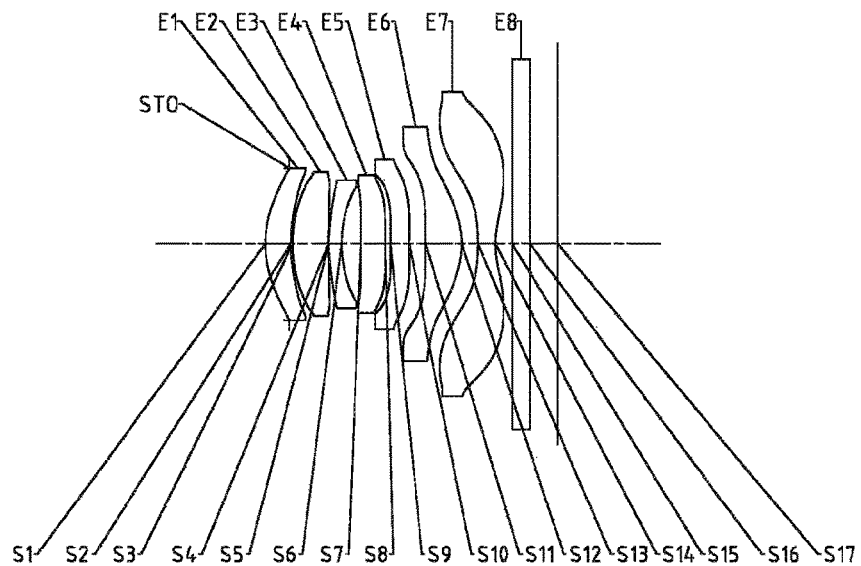
Fig. 13
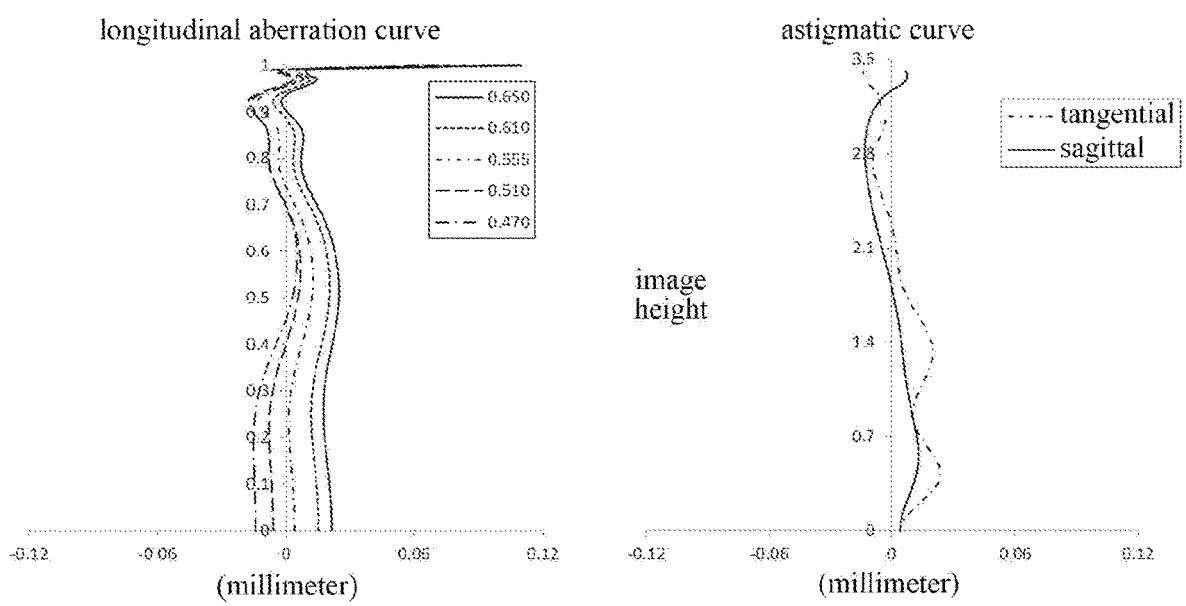
Fig. 14A
Fig. 14B

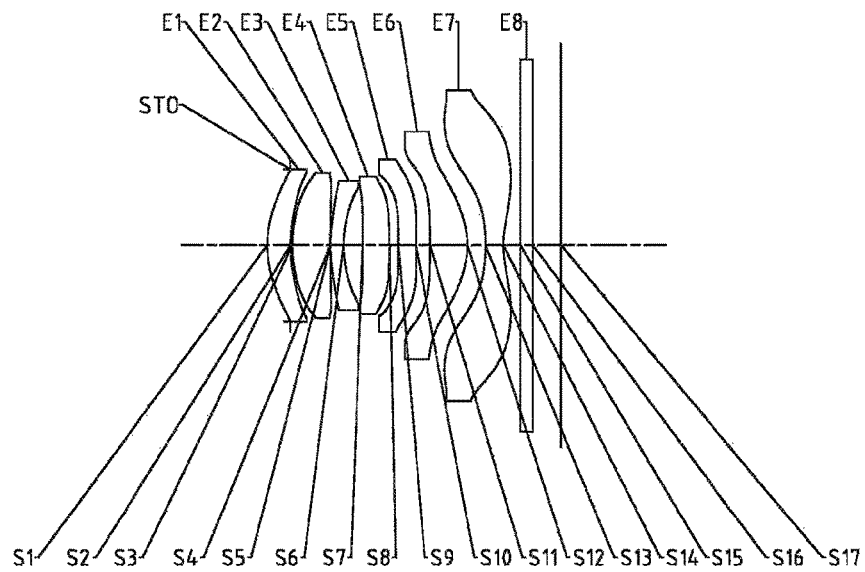
Fig. 17
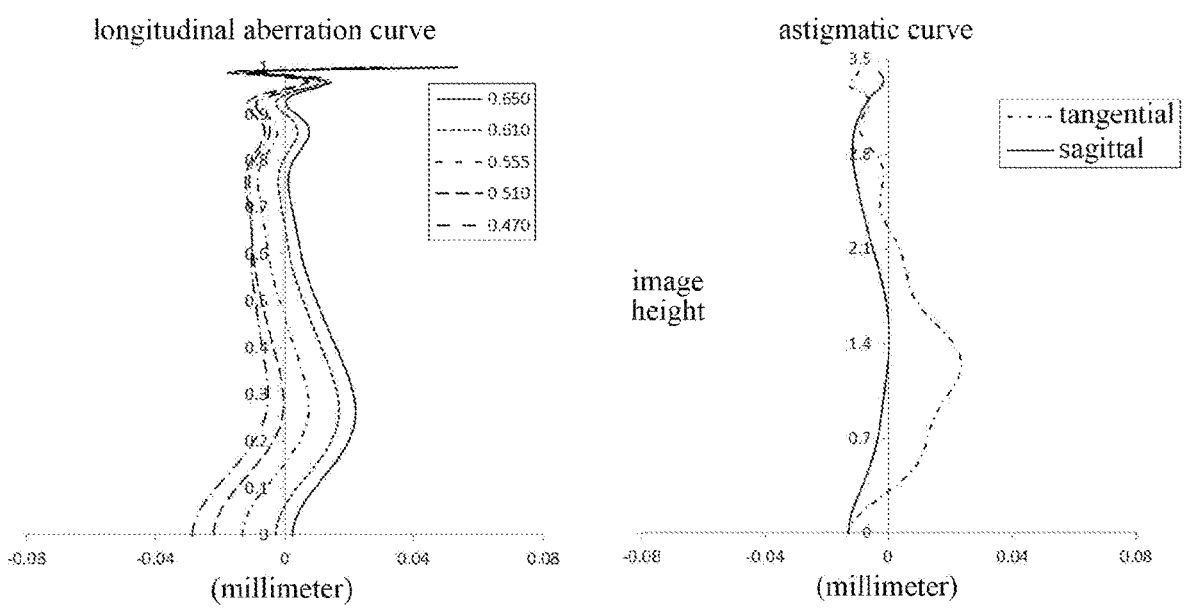
Fig. 18A
Fig. 18B

CAMERA LENS GROUP

CROSS-REFERENCE TO RELATED APPLICATIONS

This is a continuation of International Application PCT/CN2018/086745, with an international filing date of May 14, 2018, which claims priorities and rights to Chinese Patent Application No. 201710857688.9 filed with the China National Intellectual Property Administration (CNIPA) on Sep. 20, 2017 and Chinese Patent Application No. 201721207874.X filed with the CNIPA on Sep. 20, 2017, the disclosures of which are hereby incorporated by reference in their entireties.

TECHNICAL FIELD

The present disclosure relates to a camera lens group, and more specifically to a camera lens group including seven lenses.

BACKGROUND

With the improvement in performance and reduction in size of the commonly used photosensitive elements such as charge-coupled device elements (CCD) or complementary metal-oxide semiconductor elements (CMOS), higher requirements on high imaging quality and miniaturization of the counterpart camera lens assemblies have been brought forward.

Meanwhile, with the rapid update of portable electronic products such as mobile phones and tablet computers, market demands for product-end camera lens assemblies are becoming more diverse. At present, in addition to requiring the camera lens assembly to the characteristics such as high-pixel, high resolution and high relative brightness, higher requirements on the large-aperture and wide field-of-view of the lens assembly are put forward to meet imaging needs in various fields.

SUMMARY

The present disclosure provides a camera lens group such as a camera lens group having a large aperture, which may be applicable to portable electronic products and may at least or partially solve at least one of the above insufficiencies in the existing technology.

According to an aspect, the present disclosure provides a camera lens group. The camera lens group sequentially includes, from an object side to an image side along an optical axis: a first lens, a second lens, a third lens, a fourth lens, a fifth lens, a sixth lens and a seventh lens. The first lens may have a positive refractive power, and an object-side surface of the first lens may be a convex surface. The second lens may have a positive refractive power, and an object-side surface of the second lens may be a convex surface. The third lens has a refractive power, and an image-side surface of the third lens may be a concave surface. The fourth lens has a refractive power. The fifth lens has a refractive power. The sixth lens may have a positive refractive power, and an image-side surface of the sixth lens may be a convex surface. The seventh lens may have a negative refractive power, and both an object-side surface and an image-side surface of the seventh lens may be concave surfaces. A total effective focal length f of the camera lens group and an entrance pupil diameter EPD of the camera lens group may satisfy: $f/EPD \leq 1.60$.

In an embodiment, an effective focal length f2 of the second lens and an effective focal length f6 of the sixth lens may satisfy: $2 \leq f2/f6 < 3$.

In an embodiment, the total effective focal length f of the camera lens group and an effective focal length f7 of the seventh lens may satisfy: $-3 < f/f7 \leq -2$.

In an embodiment, an effective focal length f2 of the second lens and the effective focal length f7 of the seventh lens may satisfy: $-3.5 < f2/f7 < -2.0$.

In an embodiment, the third lens may have a negative refractive power, and an effective focal length f2 of the second lens and an effective focal length f3 of the third lens may satisfy: $-1 < f2/f3 \leq -0.5$.

In an embodiment, an effective focal length f1 of the first lens and an effective focal length f5 of the fifth lens may satisfy: $|f1/f5| \leq 0.5$.

In an embodiment, a center thickness CT6 of the sixth lens on the optical axis may satisfy: $0.5 \text{ mm} < CT6 < 1.0 \text{ mm}$.

In an embodiment, a center thickness CT1 of the first lens on the optical axis and a center thickness CT2 of the second lens on the optical axis may satisfy: $0.5 < CT1/CT2 < 1$.

In an embodiment, the effective focal length f6 of the sixth lens and the center thickness CT6 of the sixth lens on the optical axis may satisfy: $3.0 < f6/CT6 < 4.5$.

In an embodiment, the center thickness CT1 of the first lens on the optical axis, the center thickness CT2 of the second lens on the optical axis, and the center thickness CT6 of the sixth lens on the optical axis may satisfy: $3 < (CT1+CT2+CT6)/CT1 < 5$.

In an embodiment, a radius of curvature R12 of the image-side surface of the sixth lens and a radius of curvature R13 of the object-side surface of the seventh lens may satisfy: $0 < R12/R13 < 0.5$.

According to another aspect, the present disclosure provides a camera lens group. The camera lens group sequentially includes, from an object side to an image side along an optical axis: a first lens, a second lens, a third lens, a fourth lens, a fifth lens, a sixth lens and a seventh lens. The first lens may have a positive refractive power, and an object-side surface of the first lens may be a convex surface. The second lens may have a positive refractive power, and at least one of an object-side surface or an image-side surface of the second lens may be a convex surface. The third lens may have a refractive power, and an image-side surface of the third lens may be a concave surface. At least one of the fourth lens or the fifth lens may have a positive refractive power. The sixth lens may have a positive refractive power, and an image-side surface of the sixth lens may be a convex surface. The seventh lens may have a negative refractive power, and both an object-side surface and an image-side surface of the seventh lens may be concave surfaces. A center thickness CT1 of the first lens on the optical axis and a center thickness CT2 of the second lens on the optical axis may satisfy: $0.5 < CT1/CT2 < 1$.

By reasonably distributing the refractive powers and the surface types of the lenses, the center thicknesses of the lenses, etc., the camera lens group has a large-aperture advantage. Meanwhile, the camera lens group with the above configuration may have at least one of the beneficial effects: ultra-thin, miniaturization, large-aperture, wide-angle, low sensitivity, or high imaging quality.

BRIEF DESCRIPTION OF THE DRAWINGS

By describing non-limiting embodiments below in detail with reference to the accompanying drawings, other features, objectives and advantages of the present disclosure will be more apparent. In the accompanying drawings:

FIG. 13 is a schematic structural diagram illustrating a camera lens group according to Embodiment 7 of the present disclosure;

FIGS. 14A-14D respectively illustrate a longitudinal aberration curve, an astigmatic curve, a distortion curve and a lateral color curve of the camera lens group according to Embodiment 7;

FIG. 17 is a schematic structural diagram illustrating a camera lens group according to Embodiment 9 of the present disclosure;

FIGS. 18A-18D respectively illustrate a longitudinal aberration curve, an astigmatic curve, a distortion curve and a lateral color curve of the camera lens group according to Embodiment 9;

DETAILED DESCRIPTION OF EMBODIMENTS

Figure 1:
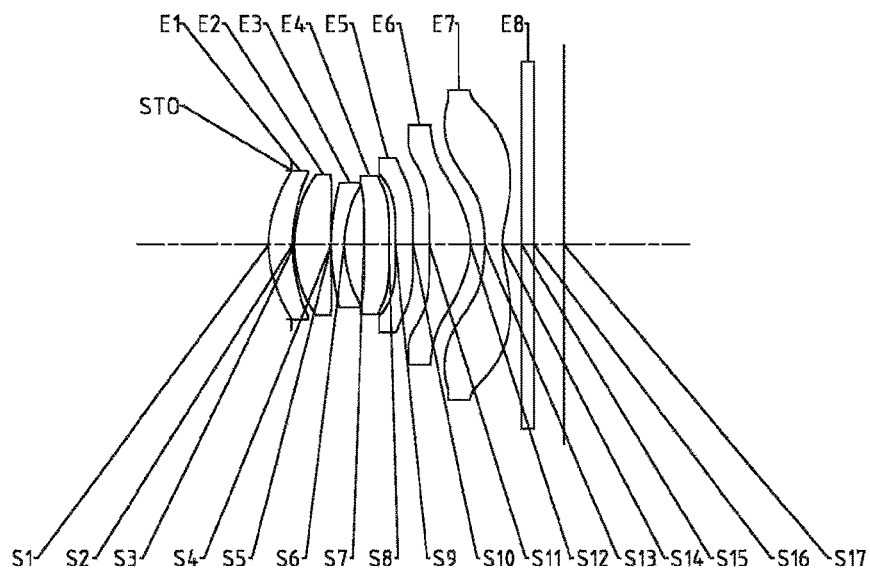
FIG. 1 is a schematic structural diagram illustrating a camera lens group according to Embodiment 1 of the present disclosure.

For a better understanding of the present disclosure, various aspects of the present disclosure will be described in more detail with reference to the accompanying drawings. It should be understood that the detailed description is merely an illustration for the exemplary embodiments of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the feature. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area. If a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the embodiments of the present disclosure, relates to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

A camera lens group according to exemplary embodiments of the present disclosure may include, for example, seven lenses (i.e., a first lens, a second lens, a third lens, a fourth lens, a fifth lens, a sixth lens and a seventh lens) having refractive powers. The seven lenses are sequentially arranged from the object side to the image side along the optical axis.

In the exemplary embodiments, the first lens may have a positive refractive power, and an object-side surface of the first lens may be a convex surface. The second lens may have a positive refractive power, and an object-side surface of the second lens may be a convex surface. The third lens has a positive refractive power or a negative refractive power, and an image-side surface of the third lens may be a concave surface. The fourth lens has a positive refractive power or a negative refractive power. The fifth lens has a positive refractive power or a negative refractive power. The sixth lens has a positive refractive power, and an image-side surface of the sixth lens may be a convex surface. The seventh lens may have a negative refractive power, an object-side surface of the seventh lens may be a concave surface, and an image-side surface of the seventh lens may be a concave surface.

In the exemplary embodiments, at least one of the object-side surface or the image-side surface of the second lens may be a convex surface. For example, the second lens may be a meniscus lens being convex to the object side and having a convex object-side surface and a concave image-side surface. Alternatively, for example, the second lens may be a biconvex lens having convex surfaces on both the object side and the image side.

In the exemplary embodiments, the third lens may have a negative refractive power.

In the exemplary embodiments, at least one of the fourth lens or the fifth lens may have a positive refractive power. For example, the fourth lens may have a positive refractive power, and the fifth lens may have a negative refractive power. Alternatively, for example, both the fourth lens and the fifth lens may have positive refractive powers.

In the application, the refractive power, surface type and center thickness of each lens may be optimally arranged to acquire a good optical performance.

An effective focal length f1 of the first lens and an effective focal length f5 of the fifth lens may satisfy: $|f1/f5| \le 0.5$, and more specifically, f1 and f5 may further satisfy: $0.01 \le |f1/f5| \le 0.44$. By properly controlling the ratio range of the effective focal lengths of the first lens to the fifth lens, the spherical aberration contribution of the fifth lens can be controlled within a reasonable range, so that the on-axis field-of-view area of the lens group has a good imaging quality.

An effective focal length f2 of the second lens and an effective focal length f3 of the third lens may satisfy: $-1 < f2/f3 \le -0.5$, and more specifically, f2 and f3 may further satisfy: $-0.70 \le f2/f3 \le -0.50$, for example, f2 and f3 may satisfy: $-0.66 \le f2/f3 \le -0.55$. By properly controlling the refractive powers of the second lens and the third lens, spherical aberrations and comas generated by the second lens and the third lens can be effectively balanced, so that the spherical aberration and coma contribution of the balanced second lens and the third lens is within a reasonable range, which in turn makes the sensitivity of the optical system at a proper level. In an exemplary embodiment, the second lens may have a positive refractive power and the third lens may have a negative refractive power.

An effective focal length f2 of the second lens and an effective focal length f6 of the sixth lens may satisfy: $2 \le f2/f6 < 3$, and more specifically, f2 and f6 may further satisfy: $2.00 \le f2/f \le 2.50$, for example, f2 and f6 may satisfy: $2.00 \le f2/f \le 2.43$. Properly distributing the refractive powers of the second lens and the sixth lens is advantageous for improving the imaging quality of the optical system. In an exemplary embodiment, both the second lens and the sixth lens may have positive refractive powers.

An effective focal length f2 of the second lens and the effective focal length f7 of the seventh lens may satisfy: $-3.5 < f2/f7 \le -2.0$, and more specifically, f2 and f7 may further satisfy: $-3.10 \le f2/f7 \le -2.40$, for example, f2 and f7 may satisfy: $-3.01 \le f2/f7 \le -2.49$. By properly controlling the ratio of the effective focal lengths of the second lens to the seventh lens, the curvatures of field generated by the second lens and the seventh lens can be effectively balanced, so that the curvature of field contribution of the balanced second lens and the seventh lens is within a reasonable range. In an exemplary embodiment, the second lens may have a positive refractive power and the seventh lens may have a negative refractive power.

The seventh lens may have a negative refractive power. The total effective focal length f of the camera lens group and an effective focal length f7 of the seventh lens may satisfy: $-3 < f/f7 \le -2$, and more specifically, f and f7 may further satisfy: $-2.20 \le f/f7 \le -2.00$, for example, f and f7 may satisfy: $-2.16 \le f/f7 \le -2.05$. By controlling the refractive power of the seventh lens within a reasonable range, so that a third-order positive spherical aberration and a fifth-order positive spherical aberration generated by the seventh lens are within a reasonable range, thereby balancing the spherical aberration generated by each of the front optical members (i.e., the lenses between the object side and the seventh lens), the on-axis field-of-view area of the lens group has a good imaging quality.

A center thickness CT1 of the first lens on the optical axis and a center thickness CT2 of the second lens on the optical axis may satisfy: $0.5 < CT1/CT2 < 1$, and more specifically, CT1 and CT2 may further satisfy: $0.60 \le CT1/CT2 \le 0.80$, for example, CT1 and CT2 may satisfy: $0.61 \le CT1/CT2 \le 0.78$. Properly controlling the center thicknesses of the first lens and the second lens can effectively control the distortion contribution of the first lens and the second lens. At the same time, it is also advantageous for the lens group to have good processing characteristics.

A center thickness CT6 of the sixth lens on the optical axis may satisfy: $0.5 \text{ mm} < CT6 < 1.0 \text{ mm}$, and more specifically, CT6 may further satisfy: $0.60 \text{ mm} \le CT6 \le 0.75 \text{ mm}$, for example, CT6 may satisfy: $0.62 \text{ mm} \le CT6 \le 0.70 \text{ mm}$. Properly arranging the center thickness of the sixth lens can control the distortion contribution of the sixth lens to be at a proper level.

The center thickness CT1 of the first lens on the optical axis, the center thickness CT2 of the second lens on the optical axis, and the center thickness CT6 of the sixth lens on the optical axis may satisfy: 3<(CT1+CT2+CT6)/CT1<5, and more specifically, CT1, CT2 and CT6 may further satisfy: 3.50≤(CT1+CT2+CT6)/CT1≤4.50, for example, CT1, CT2 and CT6 may satisfy: 3.78≤(CT1+CT2+CT6)/CT1≤4.24. Satisfying the conditional expression 3<(CT1+CT2+CT6)/CT1<5 to constrain the center thicknesses of the first lens, the second lens, and the sixth lens within a reasonable range can ensure the ultra-thin characteristic of the lens group under the condition that the processing requirements are satisfied.

The sixth lens may have a positive refractive power, the effective focal length f6 of the sixth lens and the center thickness CT6 of the sixth lens on the optical axis may satisfy: 3.0<f6/CT6<4.5, and more specifically, f6 and CT6 may further satisfy: 3.29≤f6/CT6≤4.23. By properly constraining the ratio of the effective focal length of the sixth lens to the center thickness of the sixth lens, the third-order distortion contribution of the sixth lens can be constrained to a reasonable range, so that the edge field of the lens group has a good imaging quality.

A radius of curvature R12 of the image-side surface of the sixth lens and a radius of curvature R13 of the object-side surface of the seventh lens may satisfy: 0<R12/R13<0.5, and more specifically, R12 and R13 may further satisfy: 0.30≤R12/R13≤0.40, for example, R12 and R13 may satisfy: 0.32≤R12/R13≤0.39. By properly controlling the radius of curvature of the image-side surface of the sixth lens and the radius of curvature of the object-side surface of the seventh lens, the amount of astigmatism contributed by the sixth lens and the seventh lens can be effectively balanced, thereby improving the imaging quality of the lens group.

The total effective focal length f of the camera lens group and an entrance pupil diameter EPD of the camera lens group may satisfy: f/EPD≤1.60, and more specifically, f and EPD may further satisfy: 1.57≤f/EPD≤1.59. Configuring the lens assembly to satisfy the conditional expression f/EPD≤1.60 may make the lens assembly have a large-aperture advantage in the process of increasing the luminous flux, and enhance the illumination of the image plane, thereby improving the imaging effect of the lens assembly in a dark environment.

The camera lens group may further include at least one diaphragm to improve the imaging quality of the lens assembly. Alternatively, the camera lens group may further include a diaphragm disposed between the object side and the first lens.

Alternatively, the camera lens group may further include an optical filter for correcting color deviations and/or a protective glass for protecting the photosensitive element on the image plane.

The camera lens group according to the above embodiments of the present disclosure may use a plurality of lenses, for example, seven lenses as described in the preceding text. By reasonably distributing the refractive power, surface type of each lens, the center thickness of each lens, etc., a camera lens group having advantages such as ultra-thin, wide-angle, large aperture, high imaging quality and low sensitivity and suitable for portable electronic products is provided.

In the embodiments of the present disclosure, at least one of the surfaces of the each lens is an aspheric mirror surface. The characteristic of the aspheric lens is: from the center of the lens to the periphery, the curvature is continuously changing. Unlike the spherical lens with a constant curvature from the center of the lens to the periphery, the aspheric lens has a better radius-of-curvature characteristic, having advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the camera lens group without departing from the technical solution claimed by the present disclosure. For example, although the camera lens group having seven lenses is described as an example in the embodiments, the camera lens group is not limited to include seven lenses. If desired, the camera lens group may also include other numbers of lenses.

Specific embodiments of the camera lens group that may be applied to the above embodiments are further described below with reference to the accompanying drawings.

Embodiment 1

A camera lens group according to Embodiment 1 of the present disclosure is described below with reference to FIGS. 1-2D. FIG. 1 is a schematic structural diagram illustrating the camera lens group according to Embodiment 1 of the present disclosure.

As shown in FIG. 1, the camera lens group sequentially includes a first lens E1, a second lens E2, a third lens E3, a fourth lens E4, a fifth lens E5, a sixth lens E6, a seventh lens E7 and an image plane S17 from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the camera lens group may further include an optical filter E8 having an object-side surface S15 and an image-side surface S16. Light from an object passes through the surfaces S1 to S16 sequentially and is finally imaged on the image plane S17.

Alternatively, the camera lens group may further include a diaphragm STO disposed between the object side and the first lens E1, to improve the imaging quality.

Table 1 shows the surface type, the radius of curvature, the thickness, the material and the conic coefficient of each lens of the camera lens group in Embodiment 1. The radius of curvature and the thickness are shown in millimeters (mm).

axis satisfy: CT1/CT2=0.66. The center thickness CT6 of the sixth lens E6 on the optical axis satisfies: CT6=0.69 mm. The center thickness CT1 of the first lens E1 on the optical axis, the center thickness CT2 of the second lens E2 on the optical axis and the center thickness CT6 of the sixth lens E6 on the optical axis satisfy: (CT1+CT2+CT6)/CT1=4.21.

In the present embodiment, the aspheric lens may be used for each lens, and the surface type x of each aspheric surface is defined by the following formula:

$$x = \frac{ch^2}{1 + \sqrt{1-(k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of

TABLE 1

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.3903 | | | |
| S1 | aspheric | 1.9554 | 0.4072 | 1.55 | 56.1 | −0.1143 |
| S2 | aspheric | 2.7806 | 0.0300 | | | 0.7576 |
| S3 | aspheric | 2.3492 | 0.6184 | 1.55 | 56.1 | 0.1650 |
| S4 | aspheric | 24.1754 | 0.0000 | | | −4.5316 |
| S5 | aspheric | 2.9893 | 0.2200 | 1.67 | 20.4 | −5.0042 |
| S6 | aspheric | 1.8291 | 0.3332 | | | −0.6376 |
| S7 | aspheric | 55.4451 | 0.4169 | 1.55 | 56.1 | 99.0000 |
| S8 | aspheric | −94.6302 | 0.1068 | | | 99.0000 |
| S9 | aspheric | 14.8996 | 0.3000 | 1.67 | 20.4 | −97.5110 |
| S10 | aspheric | 12.3492 | 0.2846 | | | 61.5226 |
| S11 | aspheric | 2039.5280 | 0.6906 | 1.55 | 56.1 | −99.0000 |
| S12 | aspheric | −1.2417 | 0.2406 | | | −5.9750 |
| S13 | aspheric | −3.4911 | 0.3000 | 1.54 | 55.7 | −1.6396 |
| S14 | aspheric | 1.4465 | 0.3192 | | | −9.4691 |
| S15 | spherical | infinite | 0.2100 | 1.52 | 64.2 | |
| S16 | spherical | infinite | 0.5025 | | | |
| S17 | spherical | infinite | | | | |

As may be obtained from Table 1, the radius of curvature R12 of the image-side surface S12 of the sixth lens E6 and the radius of curvature R13 of the object-side surface S13 of the seventh lens E7 satisfy: R12/R13=0.36. The center thickness CT1 of the first lens E1 on the optical axis and the center thickness CT2 of the second lens E2 on the optical curvature R in Table 1 above); k is the conic coefficient (given in Table 1 above); and Ai is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S14 in Embodiment 1.

TABLE 2

| surface number | A4 | A6 | A8 | A10 | A12 |
|---|---|---|---|---|---|
| S1 | −1.7280E−02 | 1.9160E−02 | −1.0550E−01 | 2.1896E−01 | −2.7440E−01 |
| S2 | 2.6774E−02 | −1.6913E−01 | 1.2797E−01 | 1.2818E−01 | −2.9013E−01 |
| S3 | 5.4633E−02 | −7.9180E−02 | −2.7524E−01 | 1.2616E+00 | −2.3125E+00 |
| S4 | −1.6130E−02 | 1.3695E−01 | −6.5954E−01 | 1.5409E+00 | −2.0525E+00 |
| S5 | −1.0119E−01 | 2.5289E−01 | −7.8781E−01 | 1.6764E+00 | −1.9091E+00 |
| S6 | −8.5010E−02 | 5.6948E−02 | 3.4744E−01 | −1.8437E+00 | 5.0339E+00 |
| S7 | −3.7700E−02 | 6.9207E−02 | −6.3985E−01 | 2.5317E+00 | −6.2530E+00 |
| S8 | −8.4250E−02 | −9.3830E−02 | 4.5236E−01 | −1.0834E+00 | 1.4764E+00 |
| S9 | −2.0519E−01 | 1.3893E−01 | −4.8225E−01 | 1.6674E+00 | −3.2483E+00 |
| S10 | −1.7626E−01 | 8.5557E−02 | −2.5269E−01 | 7.3555E−01 | −1.1471E+00 |
| S11 | −2.8300E−02 | −3.1720E−02 | −1.2196E−01 | 2.8939E−01 | −2.8679E−01 |

TABLE 2-continued

| | | | | | |
|---|---|---|---|---|---|
| S12 | −3.6660E−02 | −1.1080E−02 | −4.4210E−02 | 7.3376E−02 | −3.9550E−02 |
| S13 | −1.0205E−01 | −6.6280E−02 | 1.0729E−01 | −5.0100E−02 | 1.2363E−02 |
| S14 | −1.3960E−01 | 8.8700E−02 | −4.6560E−02 | 1.8657E−02 | −5.5000E−03 |

| surface number | A14 | A16 | A18 | A20 |
|---|---|---|---|---|
| S1 | 2.1339E−01 | −9.8700E−02 | 2.4822E−02 | −2.6500E−03 |
| S2 | 2.0724E−01 | −4.6050E−02 | −1.4000E−02 | 5.8130E−03 |
| S3 | 2.5019E+00 | −1.6520E+00 | 6.1904E−01 | −1.0213E−01 |
| S4 | 1.5647E+00 | −5.7980E−01 | 2.9506E−02 | 2.6228E−02 |
| S5 | 8.8548E−01 | 3.1318E−01 | −5.1065E−01 | 1.5370E−01 |
| S6 | −8.0133E+00 | 7.4998E+00 | −3.8147E+00 | 8.1219E−01 |
| S7 | 9.6060E+00 | −8.9293E+00 | 4.6056E+00 | −1.0081E+00 |
| S8 | −1.4184E+00 | 1.0054E+00 | −4.4355E−01 | 8.5976E−02 |
| S9 | 3.4220E+00 | −1.9389E+00 | 5.4970E−01 | −6.0400E−02 |
| S10 | 9.9847E−01 | −4.8884E−01 | 1.2623E−01 | −1.3410E−02 |
| S11 | 1.5453E−01 | −4.6460E−02 | 7.3230E−03 | −4.7000E−04 |
| S12 | 1.0349E−02 | −1.3700E−03 | 7.5600E−05 | −4.0000E−07 |
| S13 | −1.7800E−03 | 1.4800E−04 | −6.3000E−06 | 9.2600E−08 |
| S14 | 1.1260E−03 | −1.5000E−04 | 1.1600E−05 | −3.9000E−07 |

Table 3 shows the effective focal lengths f1-f7 of the lenses, the total effective focal length f of the camera lens group, the total track length TTL (i.e., the axial distance from the center of the object-side surface S1 of the first lens E1 to the image plane S17) and the half of the diagonal length ImgH of the effective pixel area on the image plane S17 in Embodiment 1.

TABLE 3

| parameter | f1 (mm) | f2 (mm) | f3 (mm) | f4 (mm) | f5 (mm) |
|---|---|---|---|---|---|
| value | 10.28 | 4.72 | −7.66 | 64.10 | −113.71 |
| parameter | f6 (mm) | f7 (mm) | f (mm) | TTL (mm) | ImgH (mm) |
| value | 2.27 | −1.87 | 4.00 | 4.98 | 3.36 |

As may be obtained from Table 3, the effective focal length f1 of the first lens E1 and the effective focal length f5 of the fifth lens E5 satisfy: |f1/f5|=0.09. The effective focal length f2 of the second lens E2 and the effective focal length f3 of the third lens E3 satisfy: f2/f3=−0.62. The effective focal length f2 of the second lens E2 and the effective focal length f6 of the sixth lens E6 satisfy: f2/f6=2.08. The effective focal length f2 of the second lens E2 and the effective focal length f7 of the seventh lens E7 satisfy: f2/f7=−2.53. The total effective focal length f of the camera lens group and the effective focal length f7 of the seventh lens E7 satisfy: f/f7=−2.14. As can be seen by combining Table 1 and Table 3, the effective focal length f6 of the sixth lens E6 and the center thickness CT6 of the sixth lens E6 on the optical axis satisfy: f6/CT6=3.29.

In the present embodiment, the total effective focal length f of the camera lens group and the entrance pupil diameter EPD of the camera lens group satisfy: f/EPD=1.59, and the camera lens group has a large aperture characteristic.

Figures 2A, 2B:
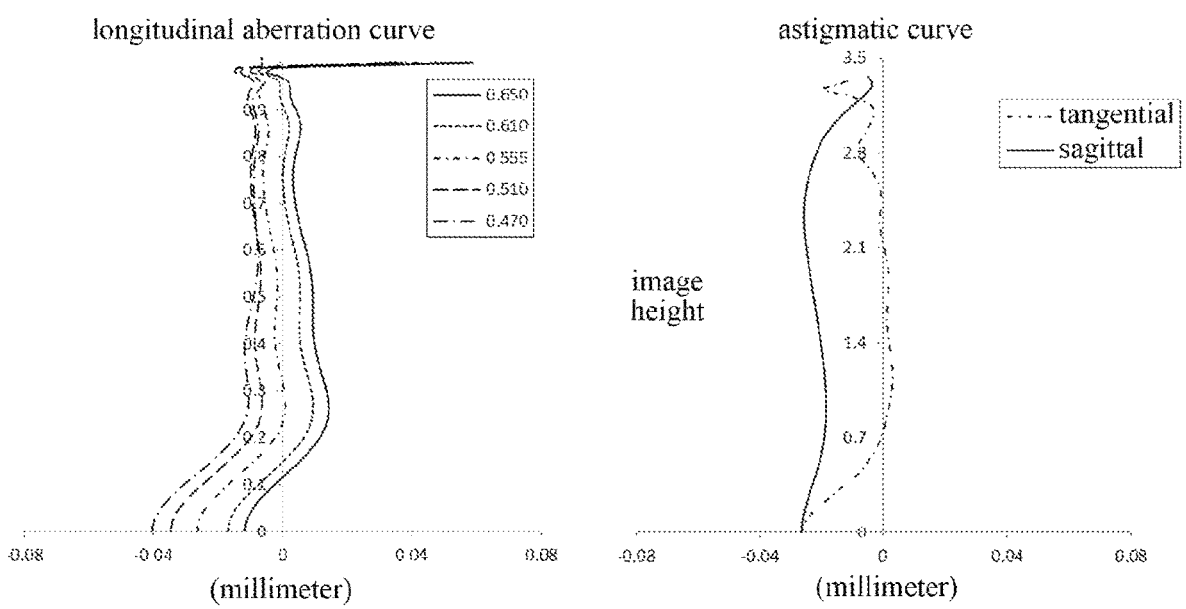
FIGS. 2A-2D respectively illustrate a longitudinal aberration curve, an astigmatic curve, a distortion curve and a lateral color curve of the camera lens group according to Embodiment 1.
Figure 2C:
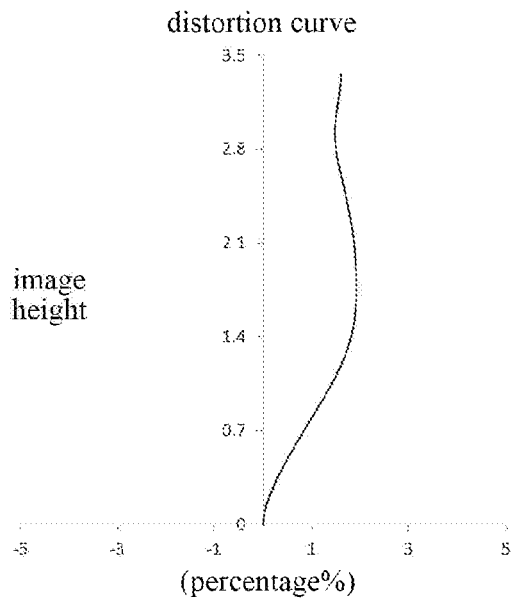
Figure 2D:
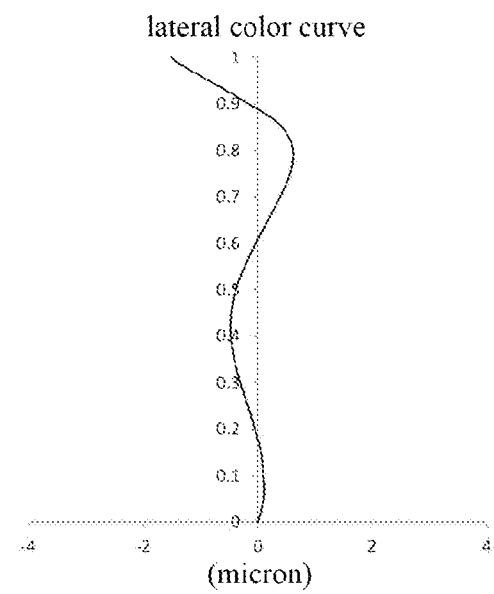

FIG. 2A shows the longitudinal aberration curve of the camera lens group according to Embodiment 1, representing deviations of focal points of light of different wavelengths converged after passing through the lens group. FIG. 2B shows the astigmatic curve of the camera lens group according to Embodiment 1, representing a curvature of the tangential image plane and a curvature of the sagittal image plane. FIG. 2C shows the distortion curve of the camera lens group according to Embodiment 1, representing amounts of distortion at different viewing angles. FIG. 2D shows the lateral color curve of the camera lens group according to Embodiment 1, representing deviations of different image heights on the image plane after light passes through the lens group. It can be seen from FIG. 2A to FIG. 2D that the camera lens group given in Embodiment 1 can achieve a good imaging quality.

Embodiment 2

Figure 3:
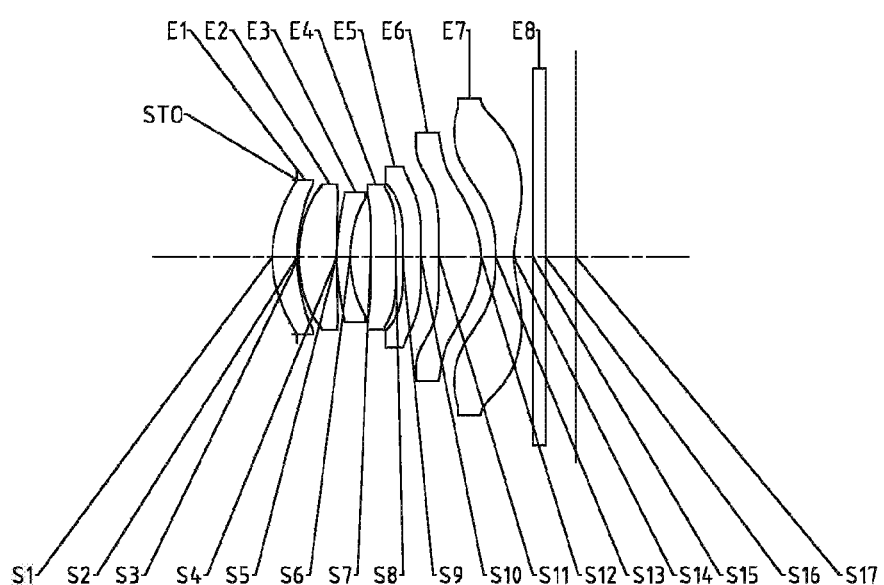
FIG. 3 is a schematic structural diagram illustrating a camera lens group according to Embodiment 2 of the present disclosure.

A camera lens group according to Embodiment 2 of the present disclosure is described below with reference to FIGS. 3-4D. In the present embodiment and the following embodiments, for the purpose of brevity, the description of parts similar to those in Embodiment 1 will be omitted. FIG. 3 is a schematic structural diagram illustrating the camera lens group according to Embodiment 2 of the present disclosure.

As shown in FIG. 3, the camera lens group sequentially includes a first lens E1, a second lens E2, a third lens E3, a fourth lens E4, a fifth lens E5, a sixth lens E6, a seventh lens E7 and an image plane S17 from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the camera lens group may further include an optical filter E8 having an object-side surface S15 and an image-side surface S16. Light from an object passes through the surfaces S1 to S16 sequentially and is finally imaged on the image plane S17.

Alternatively, the camera lens group may further include a diaphragm STO disposed between the object side and the first lens E1, to improve the imaging quality.

Table 4 shows the surface type, the radius of curvature, the thickness, the material and the conic coefficient of each lens of the camera lens group in Embodiment 2. The radius of curvature and the thickness are shown in millimeters (mm). Table 5 shows the high-order coefficients applicable to each aspheric surface in Embodiment 2. The surface type of each aspheric surface may be defined by the formula (1) given in the above Embodiment 1. Table 6 shows the effective focal lengths f1-f7 of the lenses, the total effective focal length f of the camera lens group, the total track length TTL and the half of the diagonal length ImgH of the effective pixel area on the image plane S17 in Embodiment 2.

TABLE 4

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4093 | | | |
| S1 | aspheric | 1.9650 | 0.4123 | 1.55 | 56.1 | −0.1012 |
| S2 | aspheric | 2.7353 | 0.0300 | | | 0.6637 |
| S3 | aspheric | 2.3072 | 0.6303 | 1.55 | 56.1 | 0.2088 |
| S4 | aspheric | 19.9713 | 0.0017 | | | 81.7824 |
| S5 | aspheric | 3.0598 | 0.2200 | 1.67 | 20.4 | −5.0624 |
| S6 | aspheric | 1.8605 | 0.3421 | | | −0.5918 |
| S7 | aspheric | 52.5997 | 0.4184 | 1.55 | 56.1 | 99.0000 |
| S8 | aspheric | −180.5230 | 0.1136 | | | −99.0000 |
| S9 | aspheric | 13.5405 | 0.3002 | 1.67 | 20.4 | −97.0005 |
| S10 | aspheric | 12.1688 | 0.3039 | | | 59.2067 |
| S11 | aspheric | −75139.9000 | 0.7015 | 1.55 | 56.1 | 99.0000 |
| S12 | aspheric | −1.2663 | 0.2444 | | | −5.8513 |
| S13 | aspheric | −3.5296 | 0.3000 | 1.54 | 55.7 | −1.6528 |
| S14 | aspheric | 1.4732 | 0.3168 | | | −9.8295 |
| S15 | spherical | infinite | 0.2100 | 1.52 | 64.2 | |
| S16 | spherical | infinite | 0.5048 | | | |
| S17 | spherical | infinite | | | | |

TABLE 5

| surface number | A4 | A6 | A8 | A10 | A12 |
|---|---|---|---|---|---|
| S1 | −1.5010E−02 | 1.4918E−02 | −7.8870E−02 | 1.5025E−01 | −1.7138E−01 |
| S2 | 2.4107E−02 | −1.5001E−01 | 8.7713E−02 | 2.1522E−01 | −4.660E−01 |
| S3 | 4.8506E−02 | −7.5140E−02 | −2.2379E−01 | 1.0519E+00 | −1.8971E+00 |
| S4 | −2.0970E−02 | 1.5517E−01 | −6.9648E−01 | 1.6436E+00 | −2.3024E+00 |
| S5 | −9.8360E−02 | 2.4058E−01 | −7.2214E−01 | 1.5182E+00 | −1.7776E+00 |
| S6 | −7.9990E−02 | 5.6714E−02 | 2.4860E−01 | −1.2916E+00 | 3.4444E+00 |
| S7 | −3.6780E−02 | 5.8118E−02 | −5.2416E−01 | 2.0183E+00 | −4.8754E+00 |
| S8 | −1.0155E−01 | 6.4913E−02 | −1.7673E−01 | 4.7324E−01 | −9.8779E−01 |
| S9 | −2.0388E−01 | 1.7767E−01 | −5.3405E−01 | 1.5021E+00 | −2.5834E+00 |
| S10 | −1.7348E−01 | 1.1525E−01 | −3.1927E−01 | 7.7164E−01 | −1.0891E+00 |
| S11 | −3.0690E−02 | −5.5600E−03 | −1.4757E−01 | 2.8436E−01 | −2.6149E−01 |
| S12 | −2.6060E−02 | −3.3510E−02 | 1.0780E−03 | 2.0338E−02 | −6.3700E−03 |
| S13 | −1.0039E−01 | −5.8260E−02 | 9.6408E−02 | −4.5060E−02 | 1.1276E−02 |
| S14 | −1.2992E−01 | 7.6928E−02 | −3.7590E−02 | 1.4260E−02 | −4.0700E−03 |

| surface number | A14 | A16 | A18 | A20 |
|---|---|---|---|---|
| S1 | 1.1994E−01 | −4.9030E−02 | 1.0583E−02 | −9.4000E−04 |
| S2 | 4.2380E 01 | −2.0426E−01 | 4.8246E−02 | −4.2000E−03 |
| S3 | 1.9916E+00 | −1.2634E+00 | 4.5155E−01 | −7.0620E−02 |
| S4 | 1.9493E+00 | −9.3096E−01 | 2.0562E−01 | −1.0630E−02 |

TABLE 5-continued

| | | | | |
|---|---|---|---|---|
| S5 | 9.8110E−01 | 2.8241E−02 | −2.9306E−01 | 9.6001E−02 |
| S6 | −5.3655E+00 | 4.9259E+00 | −2.4619E+00 | 5.1565E−01 |
| S7 | 7.3166E+00 | −6.6258E+00 | 3.3223E+00 | −7.0605E−01 |
| S8 | 1.1212E+00 | −6.5973E−01 | 1.8769E−01 | −1.9120E−02 |
| S9 | 2.4603E+00 | −1.2463E+00 | 3.0228E−01 | −2.5300E−02 |
| S10 | 8.8885E−01 | −4.1367E−01 | 1.0218E−01 | −1.0420E−02 |
| S11 | 1.3536E−01 | −3.9640E−02 | 6.1220E−03 | −3.9000E−04 |
| S12 | −1.4500E−03 | 1.0590E−03 | −1.9000E−04 | 1.2100E−05 |
| S13 | −1.6900E−03 | 1.5300E−04 | −7.7000E−06 | 1.6300E−07 |
| S14 | 8.1700E−04 | −1.1000E−04 | 8.1300E−06 | −2.7000E−07 |

TABLE 6

| parameter | f1 (mm) | f2 (mm) | f3 (mm) | f4 (mm) | f5 (mm) |
|---|---|---|---|---|---|
| value | 10.75 | 4.72 | −7.69 | 74.66 | −197.74 |
| parameter | f6 (mm) | f7 (mm) | f (mm) | TTL (mm) | ImgH (mm) |
| value | 2.32 | −1.90 | 4.07 | 5.05 | 3.41 |

Figure 4A:
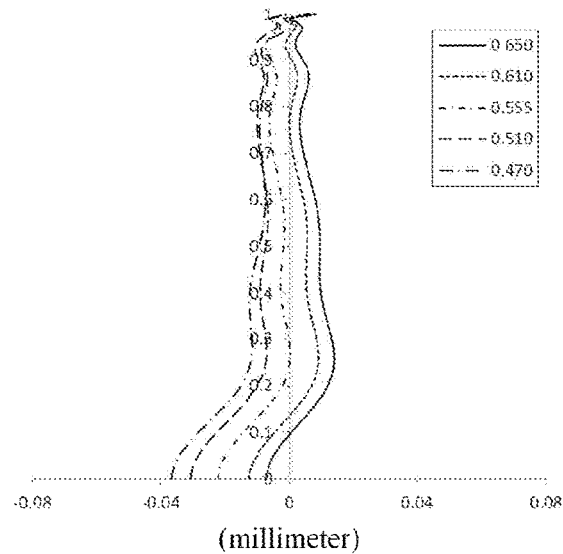
FIGS. 4A-4D respectively illustrate a longitudinal aberration curve, an astigmatic curve, a distortion curve and a lateral color curve of the camera lens group according to Embodiment 2.
Figure 4B:
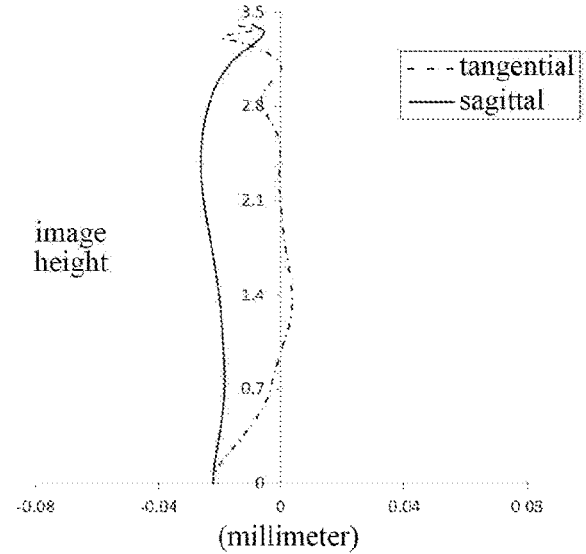
Figure 4C:
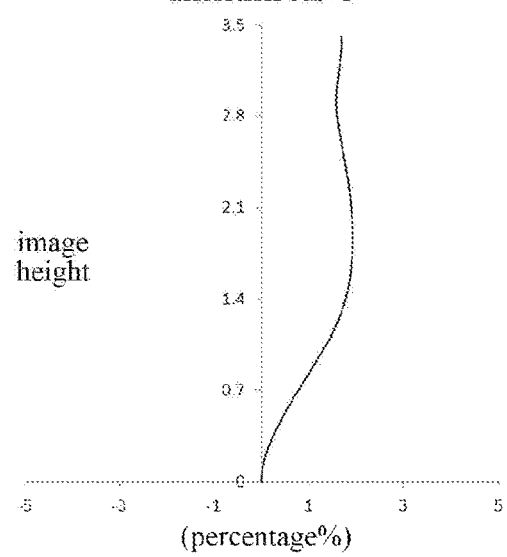
Figure 4D:
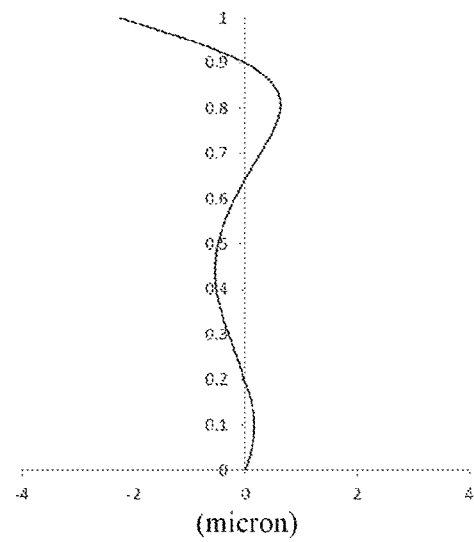

FIG. 4A shows the longitudinal aberration curve of the camera lens group according to Embodiment 2, representing deviations of focal points of light of different wavelengths converged after passing through the lens group. FIG. 4B shows the astigmatic curve of the camera lens group according to Embodiment 2, representing a curvature of the tangential image plane and a curvature of the sagittal image plane. FIG. 4C shows the distortion curve of the camera lens group according to Embodiment 2, representing amounts of distortion at different viewing angles. FIG. 4D shows the lateral color curve of the camera lens group according to Embodiment 2, representing deviations of different image heights on the image plane after light passes through the lens group. It can be seen from FIG. 4A to FIG. 4D that the camera lens group given in Embodiment 2 can achieve a good imaging quality.

Embodiment 3

Figure 5:
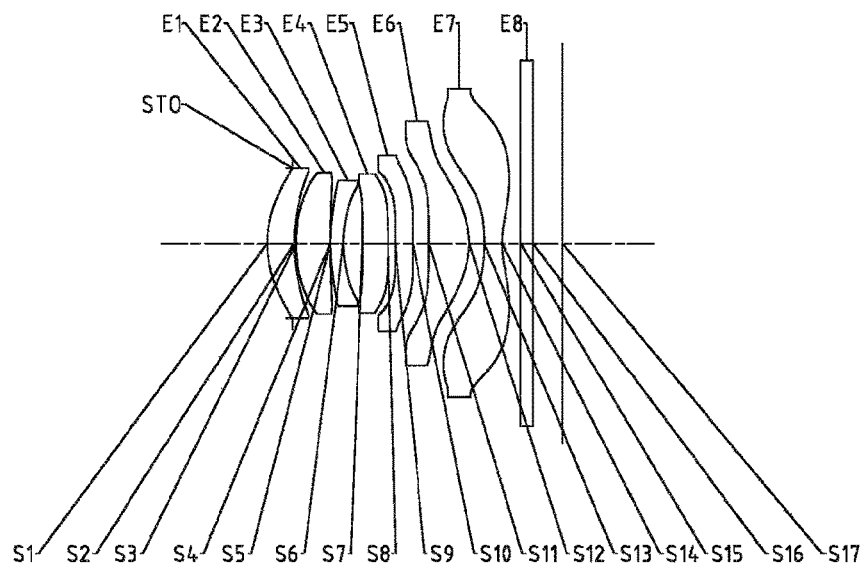
FIG. 5 is a schematic structural diagram illustrating a camera lens group according to Embodiment 3 of the present disclosure.

A camera lens group according to Embodiment 3 of the present disclosure is described below with reference to FIGS. 5-6D. FIG. 5 is a schematic structural diagram illustrating the camera lens group according to Embodiment 3 of the present disclosure.

As shown in FIG. 5, the camera lens group sequentially includes a first lens E1, a second lens E2, a third lens E3, a fourth lens E4, a fifth lens E5, a sixth lens E6, a seventh lens E7 and an image plane S17 from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the camera lens group may further include an optical filter E8 having an object-side surface S15 and an image-side surface S16. Light from an object passes through the surfaces S1 to S16 sequentially and is finally imaged on the image plane S17.

Alternatively, the camera lens group may further include a diaphragm STO disposed between the object side and the first lens E1, to improve the imaging quality.

Table 7 shows the surface type, the radius of curvature, the thickness, the material and the conic coefficient of each lens of the camera lens group in Embodiment 3. The radius of curvature and the thickness are shown in millimeters (mm). Table 8 shows the high-order coefficients applicable to each aspheric surface in Embodiment 3. The surface type of each aspheric surface may be defined by the formula (1) given in the above Embodiment 1. Table 9 shows the effective focal lengths f1-f7 of the lenses, the total effective focal length f of the camera lens group, the total track length TTL and the half of the diagonal length ImgH of the effective pixel area on the image plane S17 in Embodiment 3.

TABLE 7

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4271 | | | |
| S1 | aspheric | 1.8838 | 0.4547 | 1.55 | 56.1 | −0.1175 |
| S2 | aspheric | 2.9165 | 0.0300 | | | 0.6677 |
| S3 | aspheric | 2.5316 | 0.5825 | 1.55 | 56.1 | 0.3965 |
| S4 | aspheric | 11.5139 | 0.0017 | | | −9.4105 |
| S5 | aspheric | 3.1552 | 0.2200 | 1.67 | 20.4 | −6.0070 |
| S6 | aspheric | 2.0045 | 0.3224 | | | −0.4009 |
| S7 | aspheric | 42.2172 | 0.4338 | 1.55 | 56.1 | −99.0000 |
| S8 | aspheric | −64.8915 | 0.1217 | | | 19.2045 |
| S9 | aspheric | 14.7105 | 0.3000 | 1.67 | 20.4 | −16.5271 |
| S10 | aspheric | 11.9311 | 0.2852 | | | 61.0232 |
| S11 | aspheric | −155.5450 | 0.6824 | 1.55 | 56.1 | 99.0000 |
| S12 | aspheric | −1.2991 | 0.2569 | | | −6.1719 |
| S13 | aspheric | −3.4501 | 0.3000 | 1.54 | 55.7 | −1.6805 |
| S14 | aspheric | 1.5264 | 0.3144 | | | −10.2674 |
| S15 | spherical | infinite | 0.2100 | 1.52 | 64.2 | |
| S16 | spherical | infinite | 0.5004 | | | |
| S17 | spherical | infinite | | | | |

TABLE 8

| surface number | A4 | A6 | A8 | A10 | A12 |
|---|---|---|---|---|---|
| S1 | −1.5600E−02 | 2.4204E−02 | −9.7810E−02 | 1.7337E−01 | −1.9047E−01 |
| S2 | 2.2425E−02 | −9.9450E−02 | −3.4820E−02 | 3.1896E−01 | −4.5624E−01 |
| S3 | 4.7508E−02 | −2.5650E−02 | −3.4066E−01 | 1.1255E+00 | −1.8089E+00 |
| S4 | −3.5040E−02 | 1.5824E−01 | −5.9821E−01 | 1.1752E+00 | −1.2413E+00 |
| S5 | −1.0012E−01 | 2.2738E−01 | −6.7194E−01 | 1.3129E+00 | −1.2680E+00 |
| S6 | −6.4730E−02 | 7.1860E−03 | 3.9193E−01 | −1.7036E+00 | 4.3526E+00 |
| S7 | −4.6030E−02 | 8.8620E−02 | −6.5948E−01 | 2.2567E+00 | −4.9854E+00 |
| S8 | −9.5760E−02 | −6.8000E−04 | 1.1763E−01 | −4.0541E−01 | 5.9860E−01 |
| S9 | −2.0066E−01 | 1.4271E−01 | −2.9744E−01 | 7.9082E−01 | −1.3885E+00 |
| S10 | −1.7842E−01 | 1.3003E−01 | −3.3222E−01 | 7.9828E−01 | −1.1524E+00 |
| S11 | −3.3960E−02 | −2.2740E−02 | −1.0991E−01 | 2.4536E−01 | −2.3619E−01 |
| S12 | −4.2250E−02 | −5.3500E−03 | −3.2530E−02 | 4.8458E−02 | −2.1510E−02 |
| S13 | −1.1522E−01 | −2.6500E−02 | 6.5320E−02 | −2.8090E−02 | 5.7020E−03 |
| S14 | −1.3346E−01 | 8.5292E−02 | −4.6040E−02 | 1.9216E−02 | −5.9200E−03 |

| surface number | A14 | A16 | A18 | A20 |
|---|---|---|---|---|
| S1 | 1.2789E−01 | −4.9820E−02 | 1.0230E−02 | −8.7000E−04 |
| S2 | 3.4105E−01 | −1.3723E−01 | 2.4720E−02 | −1.0200E−03 |
| S3 | 1.7970E+00 | −1.1089E+00 | 3.9130E−01 | −6.1010E−02 |
| S4 | 5.9335E−01 | 7.1448E−02 | −1.9452E−01 | 5.6103E−02 |
| S5 | 2.8968E−01 | 5.4875E−01 | −4.9521E−01 | 1.2712E−01 |
| S6 | −6.6688E+00 | 6.0590E+00 | −3.0036E+00 | 6.2579E−01 |
| S7 | 6.9582E+00 | −5.9087E+00 | 2.7838E+00 | −5.5476E−01 |
| S8 | −6.7621E−01 | 6.1713E−01 | −3.3734E−01 | 7.5781E−02 |
| S9 | 1.2395E+00 | −4.7271E−01 | 1.6108E−02 | 2.2047E−02 |
| S10 | 9.6957E−01 | −4.6792E−01 | 1.2027E−01 | −1.2770E−02 |
| S11 | 1.2420E−01 | −3.6370E−02 | 5.5620E−03 | −3.5000E−04 |
| S12 | 3.6830E−03 | −8.4000E−06 | −6.9000E−05 | 5.9400E−06 |
| S13 | −5.6000E−04 | 1.2200E−05 | 2.0800E−06 | −1.3000E−07 |
| S14 | 1.2580E−03 | −1.7000E−04 | 1.3500E−05 | −4.6000E−07 |

TABLE 9

| parameter | f1 (mm) | f2 (mm) | f3 (mm) | f4 (mm) | f5 (mm) |
|---|---|---|---|---|---|
| value | 8.43 | 5.81 | −8.94 | 46.92 | −99.13 |

| parameter | f6 (mm) | f7 (mm) | f (mm) | TTL (mm) | ImgH (mm) |
|---|---|---|---|---|---|
| value | 2.40 | −1.93 | 4.05 | 5.02 | 3.41 |

Figures 6A, 6B:
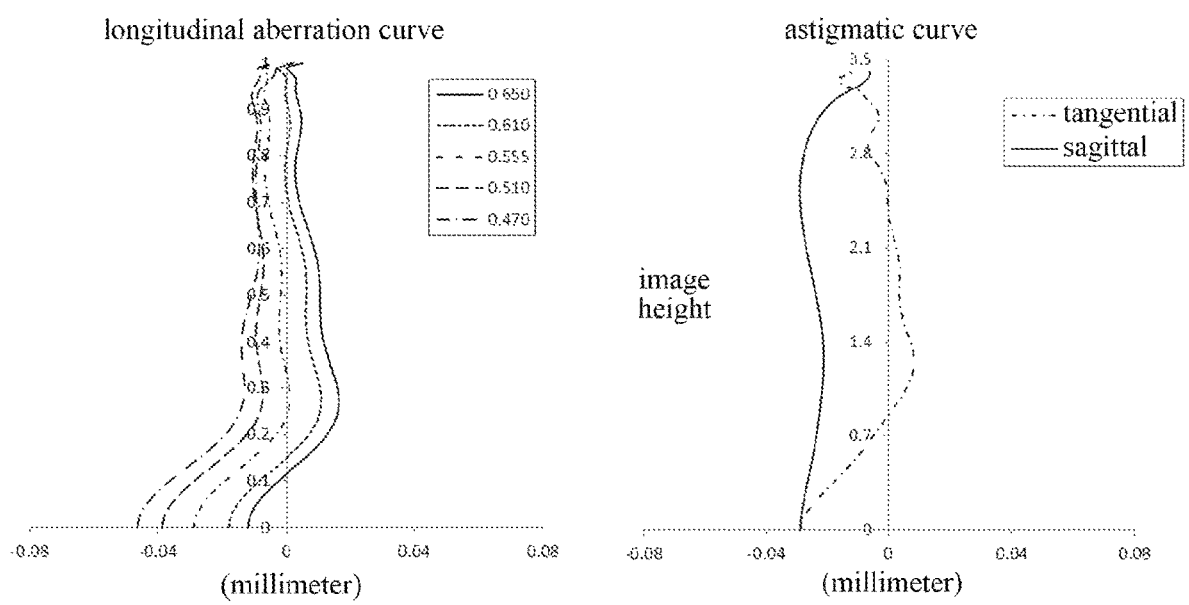
FIGS. 6A-6D respectively illustrate a longitudinal aberration curve, an astigmatic curve, a distortion curve and a lateral color curve of the camera lens group according to Embodiment 3.
Figure 6C:
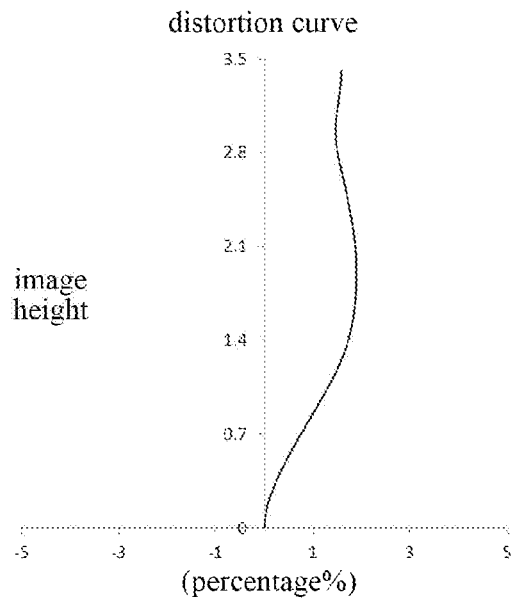
Figure 6D:
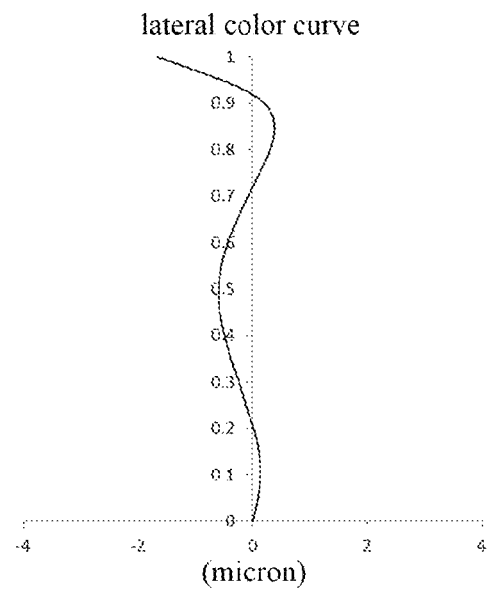

FIG. 6A shows the longitudinal aberration curve of the camera lens group according to Embodiment 3, representing deviations of focal points of light of different wavelengths converged after passing through the lens group. FIG. 6B shows the astigmatic curve of the camera lens group according to Embodiment 3, representing a curvature of the tangential image plane and a curvature of the sagittal image plane. FIG. 6C shows the distortion curve of the camera lens group according to Embodiment 3, representing amounts of distortion at different viewing angles. FIG. 6D shows the lateral color curve of the camera lens group according to Embodiment 3, representing deviations of different image heights on the image plane after light passes through the lens group. It can be seen from FIG. 6A to FIG. 6D that the camera lens group given in Embodiment 3 can achieve a good imaging quality.

Embodiment 4

Figure 7:
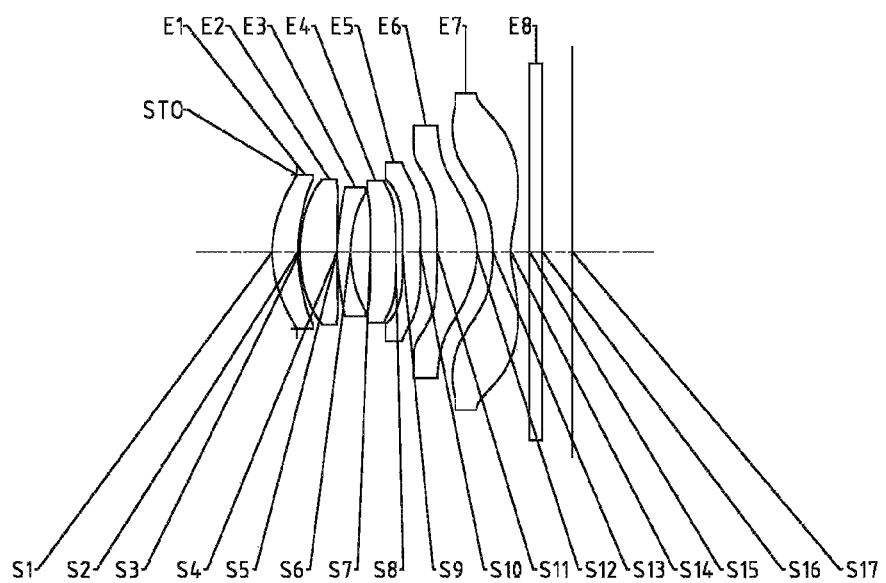
FIG. 7 is a schematic structural diagram illustrating a camera lens group according to Embodiment 4 of the present disclosure.

A camera lens group according to Embodiment 4 of the present disclosure is described below with reference to FIGS. 7-8D. FIG. 7 is a schematic structural diagram illustrating the camera lens group according to Embodiment 4 of the present disclosure.

As shown in FIG. 7, the camera lens group sequentially includes a first lens E1, a second lens E2, a third lens E3, a fourth lens E4, a fifth lens E5, a sixth lens E6, a seventh lens E7 and an image plane S17 from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the camera lens group may further include an optical filter E8 having an object-side surface S15 and an image-side surface S16. Light from an object passes through the surfaces S1 to S16 sequentially and is finally imaged on the image plane S17.

Alternatively, the camera lens group may further include a diaphragm STO disposed between the object side and the first lens E1, to improve the imaging quality.

Table 10 shows the surface type, the radius of curvature, the thickness, the material and the conic coefficient of each lens of the camera lens group in Embodiment 4. The radius of curvature and the thickness are shown in millimeters (mm). Table 11 shows the high-order coefficients applicable to each aspheric surface in Embodiment 4. The surface type of each aspheric surface may be defined by the formula (1) given in the above Embodiment 1. Table 12 shows the effective focal lengths f1-f7 of the lenses, the total effective focal length f of the camera lens group, the total track length TTL and the half of the diagonal length ImgH of the effective pixel area on the image plane S17 in Embodiment 4.

TABLE 10

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4121 | | | |
| S1 | aspheric | 1.9221 | 0.4281 | 1.55 | 56.1 | −0.1407 |
| S2 | aspheric | 2.9051 | 0.0300 | | | 0.8795 |
| S3 | aspheric | 2.4925 | 0.6196 | 1.55 | 56.1 | 0.4001 |
| S4 | aspheric | 20.1206 | 0.0037 | | | 77.9610 |
| S5 | aspheric | 3.1415 | 0.2200 | 1.67 | 20.4 | −5.7666 |
| S6 | aspheric | 1.9115 | 0.3306 | | | −0.5726 |
| S7 | aspheric | 61.0157 | 0.4196 | 1.55 | 56.1 | 99.0000 |
| S8 | aspheric | −282.2640 | 0.1085 | | | 99.0000 |
| S9 | aspheric | 12.2304 | 0.3000 | 1.67 | 20.4 | −62.9492 |
| S10 | aspheric | 11.7356 | 0.2831 | | | 60.2009 |
| S11 | aspheric | −73.1517 | 0.6596 | 1.55 | 56.1 | −99.0000 |
| S12 | aspheric | −1.3269 | 0.2632 | | | −6.3068 |
| S13 | aspheric | −3.7847 | 0.3000 | 1.54 | 55.7 | −1.2288 |
| S14 | aspheric | 1.5159 | 0.3130 | | | −9.8764 |
| S15 | spherical | infinite | 0.2100 | 1.52 | 64.2 | |
| S16 | spherical | infinite | 0.5000 | | | |
| S17 | spherical | infinite | | | | |

TABLE 11

| surface number | A4 | A6 | A8 | A10 | A12 |
|---|---|---|---|---|---|
| S1 | −1.3280E−02 | 1.7150E−03 | −4.5670E−02 | 9.6219E−02 | −1.2051E−01 |
| S2 | 4.5643E−02 | −2.3119E−01 | 2.9440E−01 | −2.1357E−01 | 1.7272E−01 |
| S3 | 7.6183E−02 | −1.7388E−01 | 3.7254E−02 | 5.2491E−01 | −1.1595E+00 |
| S4 | −2.9430E−02 | 1.5150E−01 | −6.1535E−01 | 1.3425E+00 | −1.7291E+00 |
| S5 | −1.0674E−01 | 2.2393E−01 | −5.6442E−01 | 1.0346E+00 | −9.1719E−01 |
| S6 | −8.3500E−02 | 4.7523E−02 | 3.3653E−01 | −1.6152E+00 | 4.2243E+00 |
| S7 | −3.4310E−02 | −1.6210E−02 | −7.5660E−02 | 3.1303E−01 | −8.7483E−01 |
| S8 | −1.0851E−01 | 8.4564E−02 | −3.7171E−01 | 1.2241E+00 | −2.6011E+00 |
| S9 | −2.0525E−01 | 1.8037E−01 | −5.9399E−01 | 1.8094E+00 | −3.3115E+00 |
| S10 | −1.7221E−01 | 8.9478E−02 | −2.7587E−01 | 7.9895E−01 | −1.2595E+00 |
| S11 | −2.9230E−02 | −4.9740E−02 | −9.8110E−02 | 2.7786E−01 | −2.9163E−01 |
| S12 | −4.4250E−02 | −1.5510E−02 | −2.3520E−02 | 5.1581E−02 | −2.7580E−02 |
| S13 | −1.4208E−01 | −2.3100E−03 | 6.2596E−02 | −3.3010E−02 | 8.5020E−03 |
| S14 | −1.4553E−01 | 9.7589E−02 | −5.1950E−02 | 2.0517E−02 | −5.8800E−03 |

| surface number | A14 | A16 | A18 | A20 |
|---|---|---|---|---|
| S1 | 9.2374E−02 | −4.0980E−02 | 9.6910E−03 | −9.8000E−04 |
| S2 | −1.8620E−01 | 1.5202E−01 | −6.6410E−02 | 1.1273E−02 |
| S3 | 1.3305E+00 | −9.0618E−01 | 3.4679E−01 | −5.8120E−02 |
| S4 | 1.3022E+00 | −4.9795E−01 | 4.7796E−02 | 1.3479E−02 |
| S5 | 2.8464E−02 | 6.7467E−01 | −5.3732E−01 | 1.3529E−01 |
| S6 | −6.5766E+00 | 6.0761E+00 | −3.0648E+00 | 6.4999E−01 |
| S7 | 1.4736E+00 | −1.4359E+00 | 7.5133E−01 | −1.6026E−01 |
| S8 | 3.1365E+00 | −2.0845E+00 | 7.0702E−01 | −9.3250E−02 |
| S9 | 3.3648E+00 | −1.8338E+00 | 4.7944E−01 | −4.2190E−02 |
| S10 | 1.1176E+00 | −5.6265E−01 | 1.5038E−01 | −1.6590E−02 |
| S11 | 1.6261E−01 | −5.0000E−02 | 7.9970E−03 | −5.2000E−04 |
| S12 | 6.5410E−03 | −6.7000E−04 | 7.5000E−06 | 2.2800E−06 |
| S13 | −1.2700E−03 | 1.1100E−04 | −5.2000E−06 | 9.8600E−08 |
| S14 | 1.1660E−03 | −1.5000E−04 | 1.1200E−05 | −3.7000E−07 |

TABLE 12

| parameter | f1 (mm) | f2 (mm) | f3 (mm) | f4 (mm) | f5 (mm) |
|---|---|---|---|---|---|
| value | 9.02 | 5.15 | −7.90 | 91.94 | −575.13 |
| parameter | f6 (mm) | f7 (mm) | f (mm) | TTL (mm) | ImgH (mm) |
| value | 2.47 | −1.98 | 4.07 | 4.99 | 3.41 |

Figure 8A:
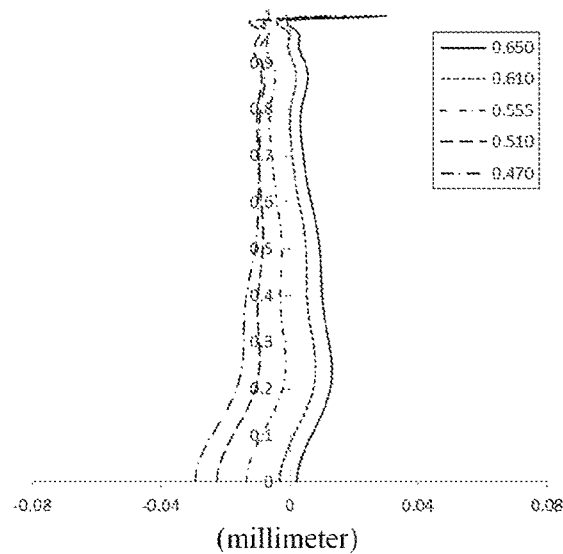
FIGS. 8A-8D respectively illustrate a longitudinal aberration curve, an astigmatic curve, a distortion curve and a lateral color curve of the camera lens group according to Embodiment 4.
Figure 8B:
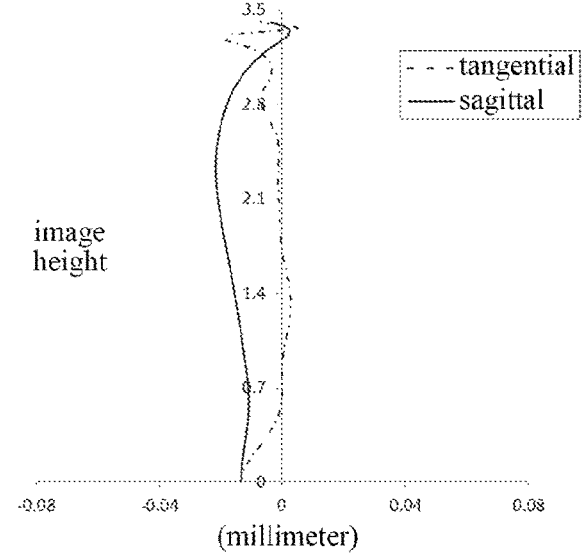
Figure 8C:
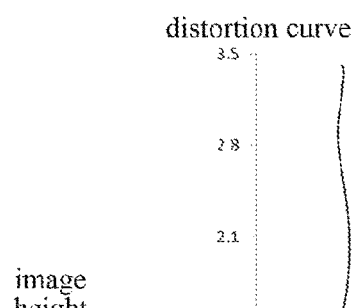
Figure 8D:
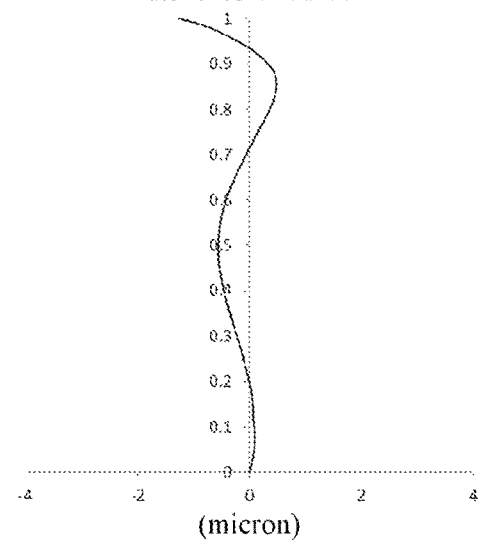

FIG. 8A shows the longitudinal aberration curve of the camera lens group according to Embodiment 4, representing deviations of focal points of light of different wavelengths converged after passing through the lens group. FIG. 8B shows the astigmatic curve of the camera lens group according to Embodiment 4, representing a curvature of the tangential image plane and a curvature of the sagittal image plane. FIG. 8C shows the distortion curve of the camera lens group according to Embodiment 4, representing amounts of distortion at different viewing angles. FIG. 8D shows the lateral color curve of the camera lens group according to Embodiment 4, representing deviations of different image heights on the image plane after light passes through the lens group. It can be seen from FIG. 8A to FIG. 8D that the camera lens group given in Embodiment 4 can achieve a good imaging quality.

Embodiment 5

Figure 9:
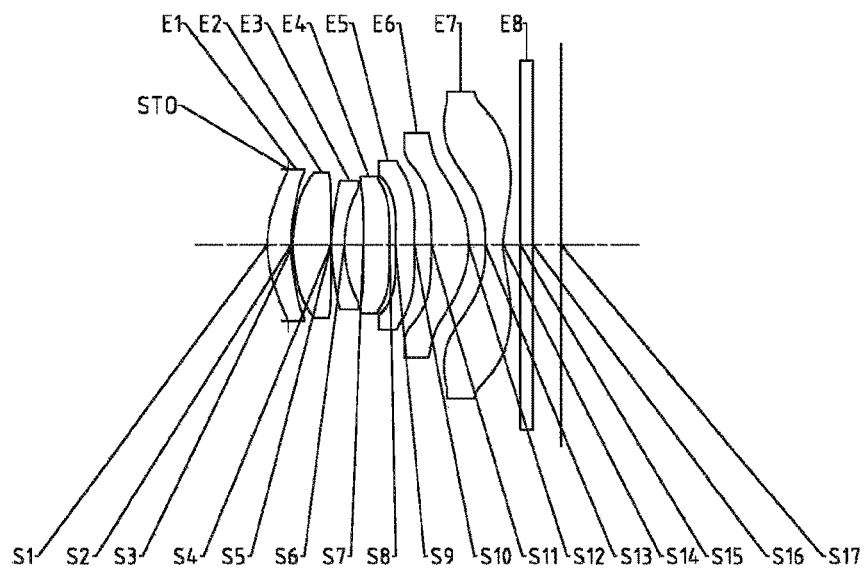
FIG. 9 is a schematic structural diagram illustrating a camera lens group according to Embodiment 5 of the present disclosure.

A camera lens group according to Embodiment 5 of the present disclosure is described below with reference to FIGS. 9-10D. FIG. 9 is a schematic structural diagram illustrating the camera lens group according to Embodiment 5 of the present disclosure.

As shown in FIG. 9, the camera lens group includes a first lens E1, a second lens E2, a third lens E3, a fourth lens E4, a fifth lens E5, a sixth lens E6, a seventh lens E7 and an image plane S17 from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a convex surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a positive refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the camera lens group may further include an optical filter E8 having an object-side surface S15 and an image-side surface S16. Light from an object passes through the surfaces S1 to S16 sequentially and is finally imaged on the image plane S17.

Alternatively, the camera lens group may further include a diaphragm STO disposed between the object side and the first lens E1, to improve the imaging quality.

Table 13 shows the surface type, the radius of curvature, the thickness, the material and the conic coefficient of each lens of the camera lens group in Embodiment 5. The radius of curvature and the thickness are shown in millimeters (mm). Table 14 shows the high-order coefficients applicable to each aspheric surface in Embodiment 5. The surface type of each aspheric surface may be defined by the formula (1) given in the above Embodiment 1. Table 15 shows the effective focal lengths f1-f7 of the lenses, the total effective focal length f of the camera lens group, the total track length TTL and the half of the diagonal length ImgH of the effective pixel area on the image plane S17 in Embodiment 5.

TABLE 13

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3575 | | | |
| S1 | aspheric | 1.9992 | 0.4050 | 1.55 | 56.1 | −0.3513 |
| S2 | aspheric | 3.3017 | 0.0300 | | | 0.6141 |
| S3 | aspheric | 2.9080 | 0.6471 | 1.55 | 56.1 | 0.9425 |
| S4 | aspheric | −2579.5300 | 0.0037 | | | −99.0000 |
| S5 | aspheric | 3.0746 | 0.2200 | 1.67 | 20.4 | −4.7672 |
| S6 | aspheric | 1.8979 | 0.3209 | | | −0.7251 |
| S7 | aspheric | 103.4682 | 0.4491 | 1.55 | 56.1 | 99.0000 |
| S8 | aspheric | −38.3544 | 0.0946 | | | 99.0000 |
| S9 | aspheric | 13.2466 | 0.3213 | 1.67 | 20.4 | 44.2883 |
| S10 | aspheric | 15.4555 | 0.2979 | | | 79.5526 |
| S11 | aspheric | −20.4203 | 0.6382 | 1.55 | 56.1 | 87.1790 |
| S12 | aspheric | −1.3710 | 0.2802 | | | −5.8011 |
| S13 | aspheric | −3.5415 | 0.3000 | 1.54 | 55.7 | −1.3506 |
| S14 | aspheric | 1.5115 | 0.2920 | | | −10.4128 |
| S15 | spherical | infinite | 0.2100 | 1.52 | 64.2 | |
| S16 | spherical | infinite | 0.4790 | | | |
| S17 | spherical | infinite | | | | |

TABLE 14

| surface number | A4 | A6 | A8 | A10 | A12 | A14 | A16 | A18 | A20 |
|---|---|---|---|---|---|---|---|---|---|
| S1 | −1.7790E−02 | 1.1882E−02 | −1.1038E−01 | 2.4335E−01 | −3.3528E−01 | 2.8996E−01 | −1.4792E−01 | 4.0529E−02 | −4.6200E−03 |
| S2 | 4.4905E−02 | −2.1153E−01 | 4.7788E−02 | 5.1329E−01 | −9.4315E−01 | 8.6671E−01 | −4.6098E−01 | 1.3388E−01 | −1.6560E−02 |
| S3 | 7.6793E−02 | −1.6436E−01 | −1.4536E−01 | 1.0909E+00 | −2.0085E+00 | 2.1020E+00 | −1.3393E+00 | 4.8137E−01 | −7.4960E−02 |
| S4 | −2.5000E−04 | −2.0080E−02 | −4.8220E−02 | 2.0145E−01 | −2.4741E−01 | 8.1503E−02 | 9.4282E−02 | −9.3800E−02 | 2.3470E−02 |
| S5 | −7.8930E−02 | 5.6362E−02 | 1.2280E−03 | −1.0870E−01 | 4.9908E−01 | −9.8891E−01 | 1.0069E+00 | −5.1998E−01 | 1.0683E−01 |
| S6 | −8.4660E−02 | 8.6757E−02 | −1.3820E−02 | −1.1876E−01 | 4.4098E−01 | −7.5101E−01 | 7.0262E−01 | −3.3575E−01 | 6.3044E−02 |
| S7 | −3.9380E−02 | 8.5386E−02 | −5.5114E−01 | 1.8112E+00 | −3.8784E+00 | 5.3046E+00 | −4.4374E+00 | 2.0682E+00 | −4.0776E−01 |
| S8 | −1.3177E−01 | 5.3447E−02 | 1.3382E−01 | −6.4691E−01 | 1.0036E+00 | −8.6726E−01 | 4.9098E−01 | −1.8021E−01 | 3.1998E−02 |
| S9 | −2.3257E−01 | 2.8367E−01 | −8.8332E−01 | 2.4870E+00 | −4.7576E+00 | 5.5381E+00 | −3.7753E+00 | 1.3969E+00 | −2.1945E−01 |
| S10 | −1.6764E−01 | 1.5283E−01 | −3.8833E−01 | 8.4793E−01 | −1.1891E+00 | 1.0127E+00 | −5.0723E−01 | 1.3745E−01 | −1.5520E−02 |
| S11 | −4.2020E−02 | −7.5340E−02 | 8.7630E−02 | −1.2352E−01 | 1.5215E−01 | −1.2496E−01 | 5.9976E−02 | −1.4800E−02 | 1.4440E−03 |
| S12 | −1.8520E−02 | −1.0952E−01 | 1.7713E−01 | −1.8518E−01 | 1.2862E−01 | −5.3390E−02 | 1.2697E−02 | −1.6000E−03 | 8.3700E−05 |
| S13 | −1.6177E−01 | 7.4627E−02 | −2.9630E−02 | 2.1359E−02 | −1.0020E−02 | 2.5850E−03 | −3.8000E−04 | 2.9200E−05 | −9.5000E−07 |
| S14 | −1.3621E−01 | 1.0209E−01 | −6.2070E−02 | 2.7222E−02 | −8.3200E−03 | 1.7010E−03 | −2.2000E−04 | 1.6300E−05 | −5.2000E−07 |

TABLE 15

| parameter | f1 (mm) | f2 (mm) | f3 (mm) | f4 (mm) | f5 (mm) |
|---|---|---|---|---|---|
| value | 8.36 | 5.32 | −8.05 | 51.31 | 131.57 |
| parameter | f6 (mm) | f7 (mm) | f (mm) | TTL (mm) | ImgH (mm) |
| value | 2.66 | −1.93 | 4.07 | 4.99 | 3.41 |

Figures 10A, 10B:
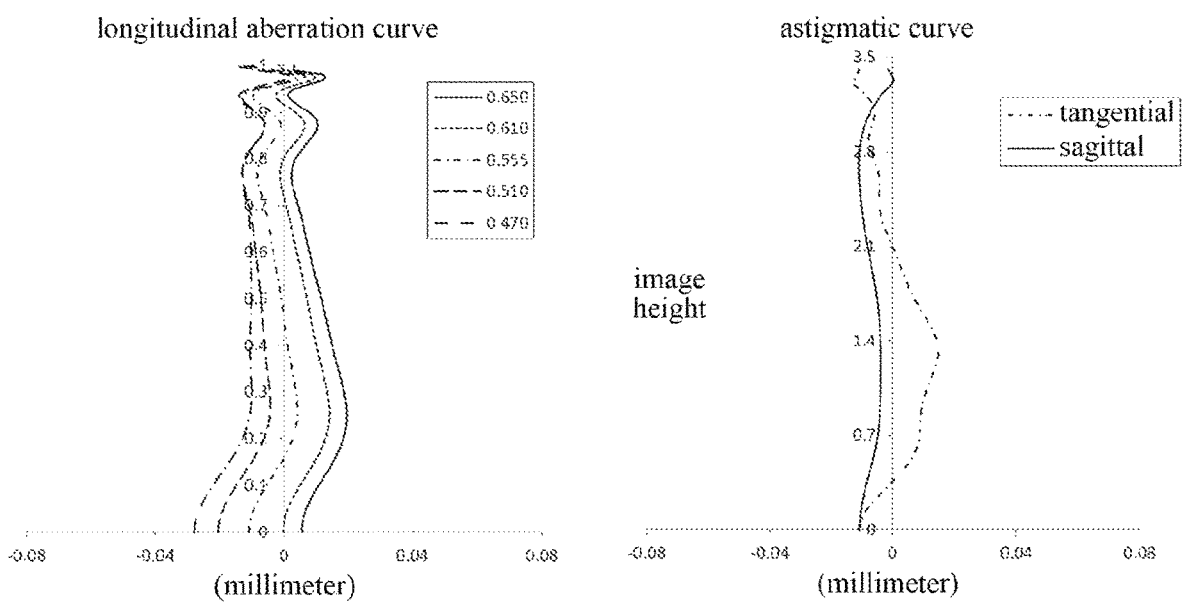
FIGS. 10A-10D respectively illustrate a longitudinal aberration curve, an astigmatic curve, a distortion curve and a lateral color curve of the camera lens group according to Embodiment 5.
Figure 10C:
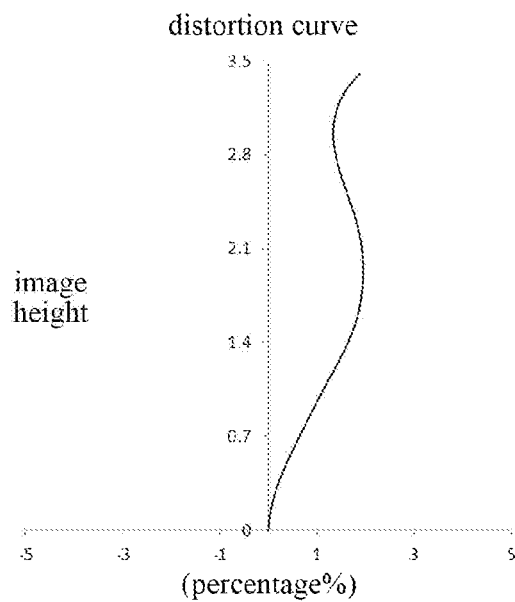
Figure 10D:
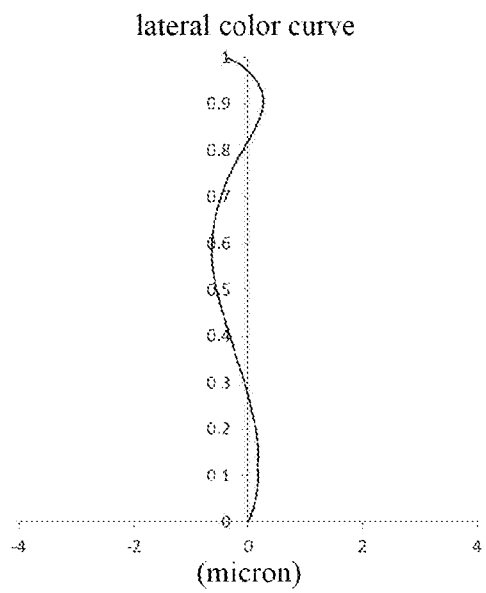

FIG. 10A shows the longitudinal aberration curve of the camera lens group according to Embodiment 5, representing deviations of focal points of light of different wavelengths converged after passing through the lens group. FIG. 10B shows the astigmatic curve of the camera lens group according to Embodiment 5, representing a curvature of the tangential image plane and a curvature of the sagittal image plane. FIG. 10C shows the distortion curve of the camera lens group according to Embodiment 5, representing amounts of distortion at different viewing angles. FIG. 10D shows the lateral color curve of the camera lens group according to Embodiment 5, representing deviations of different image heights on the image plane after light passes through the lens group. It can be seen from FIG. 10A to FIG. 10D that the camera lens group given in Embodiment 5 can achieve a good imaging quality.

Embodiment 6

Figure 11:
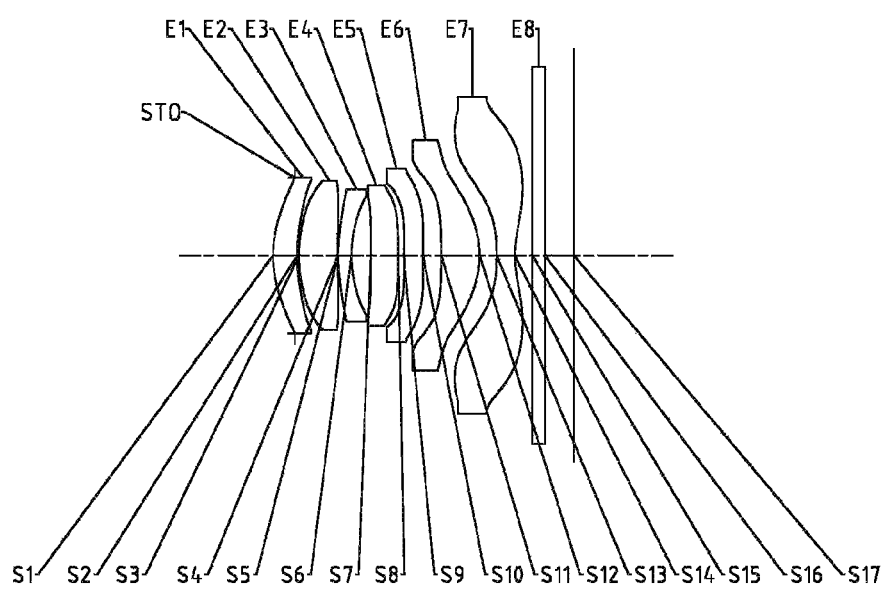
FIG. 11 is a schematic structural diagram illustrating a camera lens group according to Embodiment 6 of the present disclosure.

A camera lens group according to Embodiment 6 of the present disclosure is described below with reference to FIGS. 11-12D. FIG. 11 is a schematic structural diagram illustrating the camera lens group according to Embodiment 6 of the present disclosure.

As shown in FIG. 11, the camera lens group sequentially includes a first lens E1, a second lens E2, a third lens E3, a fourth lens E4, a fifth lens E5, a sixth lens E6, a seventh lens E7 and an image plane S17 from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a concave surface, an image-side surface S8 of the fourth lens E4 is a convex surface, and the object-side surface S7 and the image-side surface S8 of the fourth lens E4 are both aspheric surfaces.

The fifth lens E5 has a positive refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the camera lens group may further include an optical filter E8 having an object-side surface S15 and an image-side surface S16. Light from an object passes through the surfaces S1 to S16 sequentially and is finally imaged on the image plane S17.

Alternatively, the camera lens group may further include a diaphragm STO disposed between the object side and the first lens E1, to improve the imaging quality.

Table 16 shows the surface type, the radius of curvature, the thickness, the material and the conic coefficient of each lens of the camera lens group in Embodiment 6. The radius of curvature and the thickness are shown in millimeters (mm). Table 17 shows the high-order coefficients applicable to each aspheric surface in Embodiment 6. The surface type of each aspheric surface may be defined by the formula (1) given in the above Embodiment 1. Table 18 shows the effective focal lengths f1-f7 of the lenses, the total effective focal length f of the camera lens group, the total track length TTL and the half of the diagonal length ImgH of the effective pixel area on the image plane S17 in Embodiment 6.

TABLE 16

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3588 | | | |
| S1 | aspheric | 2.0000 | 0.3995 | 1.55 | 56.1 | −0.3198 |
| S2 | aspheric | 3.0698 | 0.0300 | | | 0.3507 |
| S3 | aspheric | 2.6408 | 0.6462 | 1.55 | 56.1 | 0.7328 |
| S4 | aspheric | 23.6274 | 0.0037 | | | −2.5928 |
| S5 | aspheric | 2.9504 | 0.2200 | 1.67 | 20.4 | −5.7902 |
| S6 | aspheric | 1.9403 | 0.3217 | | | −0.5563 |
| S7 | aspheric | −8227.2800 | 0.4556 | 1.55 | 56.1 | 99.0000 |
| S8 | aspheric | −27.3498 | 0.0914 | | | −53.4428 |
| S9 | aspheric | 14.1892 | 0.3188 | 1.67 | 20.4 | 47.7938 |
| S10 | aspheric | 17.8203 | 0.3032 | | | 96.8064 |
| S11 | aspheric | −18.5713 | 0.6374 | 1.55 | 56.1 | 97.6891 |
| S12 | aspheric | −1.3792 | 0.2816 | | | −5.8047 |
| S13 | aspheric | −3.5576 | 0.3000 | 1.54 | 55.7 | −1.3439 |
| S14 | aspheric | 1.5262 | 0.2914 | | | −10.1700 |
| S15 | spherical | infinite | 0.2100 | 1.52 | 64.2 | |
| S16 | spherical | infinite | 0.4785 | | | |
| S17 | spherical | infinite | | | | |

TABLE 17

| surface number | A4 | A6 | A8 | A10 | A12 | A14 | A16 | A18 | A20 |
|---|---|---|---|---|---|---|---|---|---|
| S1 | −1.7490E−02 | 1.0545E−02 | −1.0366E−01 | 2.2802E−01 | −3.0883E−01 | 2.6334E−01 | −1.3341E−01 | 3.6497E−02 | −4.1700E−03 |
| S2 | 4.2431E−02 | −2.2165E−01 | 8.3299E−02 | 4.9982E−01 | −1.0137E+00 | 9.8657E−01 | −5.4774E−01 | 1.6482E−01 | −2.0990E−02 |
| S3 | 7.3633E−02 | −1.6729E−01 | −1.4182E−01 | 1.1690E+00 | −2.2504E+00 | 2.4232E+00 | −1.5687E+00 | 5.6893E−01 | −8.9110E−02 |
| S4 | −3.3180E−02 | 3.5466E−02 | −9.5370E−02 | 1.5626E−01 | −1.4410E−02 | −2.9180E−01 | 4.1315E−01 | −2.3789E−01 | 5.0227E−02 |
| S5 | −8.3750E−02 | 5.4946E−02 | 2.5950E−02 | −1.9154E−01 | 6.9399E−01 | −1.2893E+00 | 1.2837E+00 | −6.5860E−01 | 1.3550E−01 |
| S6 | −6.5060E−02 | 2.2914E−02 | 1.2903E−01 | −3.9012E−01 | 8.9145E−01 | −1.3321E+00 | 1.2068E+00 | −5.8914E−01 | 1.1800E−01 |
| S7 | −3.5620E−02 | 5.7507E−02 | −4.3162E−01 | 1.4646E+00 | −3.2674E+00 | 4.6581E+00 | −4.0417E+00 | 1.9432E+00 | −3.9304E−01 |
| S8 | −1.2804E−01 | 4.7398E−02 | 9.0884E−02 | −4.2667E−01 | 4.6321E−01 | −1.4939E−01 | −3.1120E−02 | 1.5066E−02 | 2.7690E−03 |
| S9 | −2.2238E−01 | 2.6470E−01 | −8.2142E−01 | 2.3422E+00 | −4.5433E+00 | 5.2801E+00 | −3.5373E+00 | 1.2694E+00 | −1.9132E−01 |
| S10 | −1.5638E−01 | 1.2202E−01 | −2.9636E−01 | 6.9773E−01 | −1.0458E+00 | 9.2713E−01 | −4.7471E−01 | 1.3019E−01 | −1.4800E−02 |
| S11 | −4.3640E−02 | −6.0770E−02 | 2.3600E−02 | 1.1500E−02 | 4.5930E−03 | −3.2050E−02 | 2.5525E−02 | −7.7900E−03 | 8.3900E−04 |
| S12 | −2.2390E−02 | −9.7440E−02 | 1.3510E−01 | −1.2673E−01 | 8.8843E−02 | −3.8510E−02 | 9.5690E−03 | −1.2600E−03 | 6.8200E−05 |
| S13 | −1.5116E−01 | 3.8773E−02 | 9.5520E−03 | −2.1000E−04 | −3.0700E−03 | 1.2110E−03 | −2.1000E−04 | 1.8000E−05 | −6.2000E−07 |
| S14 | −1.3486E−01 | 9.5105E−02 | −5.4750E−02 | 2.3155E−02 | −6.9400E−03 | 1.4100E−03 | −1.8000E−04 | 1.3600E−05 | −4.4000E−07 |

TABLE 18

| parameter | f1 (mm) | f2 (mm) | f3 (mm) | f4 (mm) | f5 (mm) |
|---|---|---|---|---|---|
| value | 9.29 | 5.39 | −9.32 | 50.26 | 101.06 |
| parameter | f6 (mm) | f7 (mm) | f (mm) | TTL (mm) | ImgH (mm) |
| value | 2.69 | −1.95 | 4.07 | 4.99 | 3.41 |

Figure 12A:
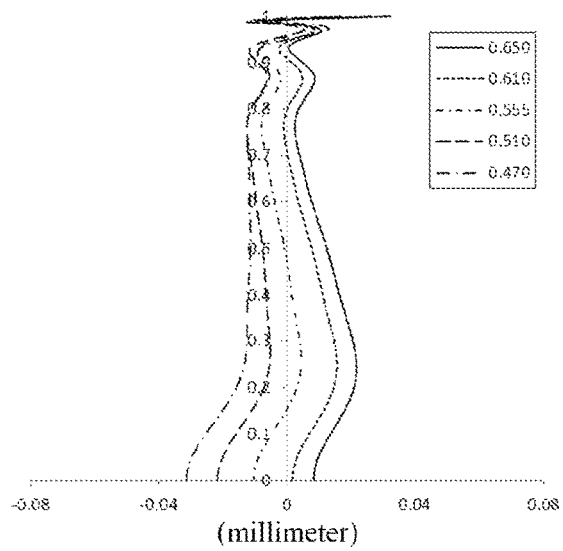
FIGS. 12A-12D respectively illustrate a longitudinal aberration curve, an astigmatic curve, a distortion curve and a lateral color curve of the camera lens group according to Embodiment 6.
Figure 12B:
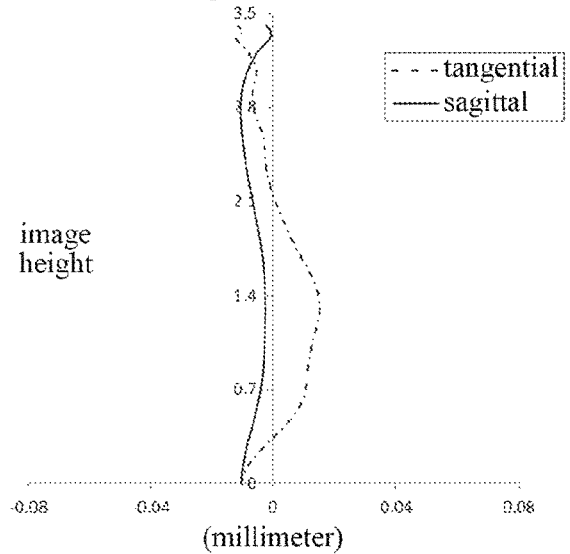
Figure 12C:
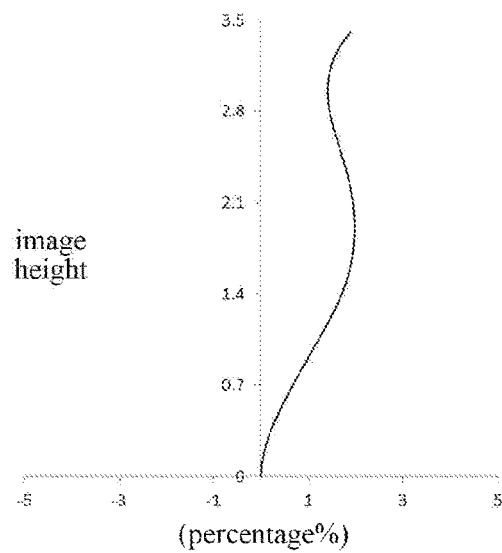
Figure 12D:
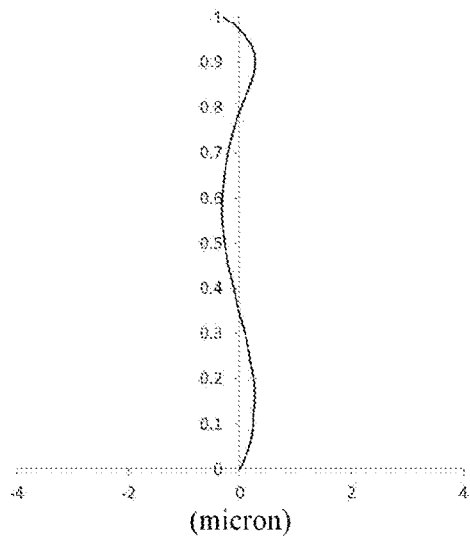

FIG. 12A shows the longitudinal aberration curve of the camera lens group according to Embodiment 6, representing deviations of focal points of light of different wavelengths converged after passing through the lens group. FIG. 12B shows the astigmatic curve of the camera lens group according to Embodiment 6, representing a curvature of the tangential image plane and a curvature of the sagittal image plane. FIG. 12C shows the distortion curve of the camera lens group according to Embodiment 6, representing amounts of distortion at different viewing angles. FIG. 12D shows the lateral color curve of the camera lens group according to Embodiment 6, representing deviations of different image heights on the image plane after light passes through the lens group. It can be seen from FIG. 12A to FIG. 12D that the camera lens group given in Embodiment 6 can achieve a good imaging quality.

Embodiment 7

A camera lens group according to Embodiment 7 of the present disclosure is described below with reference to FIGS. 13-14D. FIG. 13 is a schematic structural diagram illustrating the camera lens group according to Embodiment 7 of the present disclosure.

As shown in FIG. 13, the camera lens group sequentially includes a first lens E1, a second lens E2, a third lens E3, a fourth lens E4, a fifth lens E5, a sixth lens E6, a seventh lens E7 and an image plane S17 from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a concave surface, and the object-side surface S7 and the image-side surface S8 of the fourth lens E4 are both aspheric surfaces.

The fifth lens E5 has a positive refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the camera lens group may further include an optical filter E8 having an object-side surface S15 and an image-side surface S16. Light from an object passes through the surfaces S1 to S16 sequentially and is finally imaged on the image plane S17.

Alternatively, the camera lens group may further include a diaphragm STO disposed between the object side and the first lens E1, to improve the imaging quality.

Table 19 shows the surface type, the radius of curvature, the thickness, the material and the conic coefficient of each lens of the camera lens group in Embodiment 7. The radius of curvature and the thickness are shown in millimeters (mm). Table 20 shows the high-order coefficients applicable to each aspheric surface in Embodiment 7. The surface type of each aspheric surface may be defined by the formula (1) given in the above Embodiment 1. Table 21 shows the effective focal lengths f1-f7 of the lenses, the total effective focal length f of the camera lens group, the total track length TTL and the half of the diagonal length ImgH of the effective pixel area on the image plane S17 in Embodiment 7.

TABLE 19

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4082 | | | |
| S1 | aspheric | 1.9468 | 0.4335 | 1.55 | 56.1 | −0.1609 |
| S2 | aspheric | 3.0008 | 0.0300 | | | 0.8311 |
| S3 | aspheric | 2.5584 | 0.6119 | 1.55 | 56.1 | 0.1383 |
| S4 | aspheric | 18.3072 | 0.0037 | | | 54.3589 |
| S5 | aspheric | 3.2185 | 0.2200 | 1.67 | 20.4 | −5.2185 |
| S6 | aspheric | 2.0045 | 0.3247 | | | −0.2444 |
| S7 | aspheric | 86.5686 | 0.4172 | 1.55 | 56.1 | 99.0000 |
| S8 | aspheric | 300.0000 | 0.0880 | | | 99.0000 |
| S9 | aspheric | 11.2649 | 0.3196 | 1.67 | 20.4 | −62.2636 |
| S10 | aspheric | 11.7359 | 0.2909 | | | 59.7388 |
| S11 | aspheric | −71.1246 | 0.6160 | 1.55 | 56.1 | −99.0000 |
| S12 | aspheric | −1.3452 | 0.2735 | | | −8.7322 |
| S13 | aspheric | −4.1508 | 0.3000 | 1.54 | 55.7 | −1.1667 |
| S14 | aspheric | 1.4405 | 0.2865 | | | −9.4139 |
| S15 | spherical | infinite | 0.3000 | 1.52 | 64.2 | |
| S16 | spherical | infinite | 0.4735 | | | |
| S17 | spherical | infinite | | | | |

TABLE 20

| surface number | A4 | A6 | A8 | A10 | A12 | A14 | A16 | A18 | A20 |
|---|---|---|---|---|---|---|---|---|---|
| S1 | −1.1660E−02 | 4.8290E−03 | −5.5810E−02 | 1.0870E−01 | −1.2983E−01 | 9.6836E−02 | −4.2670E−02 | 1.0236E−02 | −1.0700E−03 |
| S2 | 5.4105E−02 | −2.3974E−01 | 2.1479E−01 | 7.9110E−02 | −3.3130E−01 | 3.3256E−01 | −1.7089E−01 | 4.4878E−02 | −4.9700E−03 |
| S3 | 8.1733E−02 | −1.8717E−01 | −6.9500E−03 | 7.0934E−01 | −1.4721E+00 | 1.6574E+00 | −1.1225E+00 | 4.2862E−01 | −7.1460E−02 |
| S4 | −4.7900E−03 | −6.2290E−02 | 6.6110E−02 | 1.2473E−01 | −3.9610E−01 | 4.2268E−01 | −1.7857E−01 | −8.6000E−05 | 1.2797E−02 |
| S5 | −6.0030E−02 | −4.4850E−02 | 3.2852E−01 | −7.8923E−01 | 1.4670E+00 | −1.9346E+00 | 1.6292E+00 | −7.7259E−01 | 1.5419E−01 |
| S6 | −7.2160E−02 | 1.1156E−01 | −3.3247E−01 | 1.1102E+00 | −2.1665E+00 | 2.5300E+00 | −1.7058E+00 | 6.0295E−01 | −8.3380E−02 |
| S7 | −6.0300E−03 | −2.1552E−01 | 9.7194E−01 | −2.9793E+00 | 5.6908E+00 | −6.8679E+00 | 5.1111E+00 | −2.1406E+00 | 3.8858E−01 |
| S8 | −1.5592E−01 | 2.3442E−01 | −6.2732E−01 | 1.4739E+00 | −2.6149E+00 | 2.8700E+00 | −1.7963E+00 | 5.8211E−01 | −7.3800E−02 |
| S9 | −2.3649E−01 | 1.8222E−01 | −1.9078E−01 | 4.9560E−01 | −1.1744E+00 | 1.3696E+00 | −7.8249E−01 | 1.9943E−01 | −1.5130E−02 |
| S10 | −1.7564E−01 | 1.0255E−01 | −2.4389E−01 | 6.7647E−01 | −1.0666E+00 | 9.4467E−01 | −4.7449E−01 | 1.2684E−01 | −1.4040E−02 |
| S11 | −4.0230E−02 | −1.2510E−02 | −1.2356E−01 | 2.5801E−01 | −2.3757E−01 | 1.1719E−01 | −3.1240E−02 | 4.1670E−03 | −2.1000E−04 |
| S12 | −9.8040E−02 | 1.0640E−01 | −1.6217E−01 | 1.5839E−01 | −8.4120E−02 | 2.5972E−02 | −4.7400E−03 | 4.7900E−04 | −2.1000E−05 |
| S13 | −1.2794E−01 | 6.4050E−03 | 3.6111E−02 | −1.4710E−02 | 1.9840E−03 | 1.0100E−04 | −6.1000E−05 | 6.8000E−06 | −2.6000E−07 |
| S14 | −1.4207E−01 | 1.0127E−01 | −5.7940E−02 | 2.3955E−02 | −6.9900E−03 | 1.3850E−03 | −1.8000E−04 | 1.3100E−05 | −4.2000E−07 |

TABLE 21

| parameter | f1 (mm) | f2 (mm) | f3 (mm) | f4 (mm) | f5 (mm) |
|---|---|---|---|---|---|
| value | 8.87 | 5.37 | −8.61 | 222.73 | 331.68 |
| parameter | f6 (mm) | f7 (mm) | f (mm) | TTL (mm) | ImgH (mm) |
| value | 2.50 | −1.96 | 4.08 | 4.99 | 3.41 |

Figures 14C, 14D:
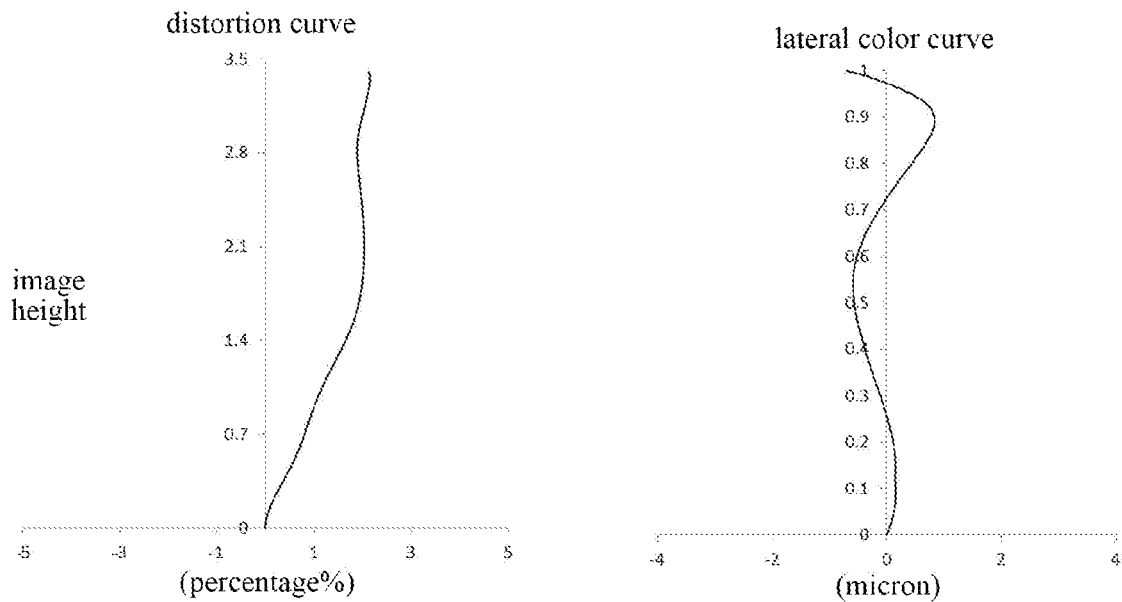

FIG. 14A shows the longitudinal aberration curve of the camera lens group according to Embodiment 7, representing deviations of focal points of light of different wavelengths converged after passing through the lens group. FIG. 14B shows the astigmatic curve of the camera lens group according to Embodiment 7, representing a curvature of the tangential image plane and a curvature of the sagittal image plane. FIG. 14C shows the distortion curve of the camera lens group according to Embodiment 7, representing amounts of distortion at different viewing angles. FIG. 14D shows the lateral color curve of the camera lens group according to Embodiment 7, representing deviations of different image heights on the image plane after light passes through the lens group. It can be seen from FIG. 14A to FIG. 14D that the camera lens group given in Embodiment 7 can achieve a good imaging quality.

Embodiment 8

Figure 15:
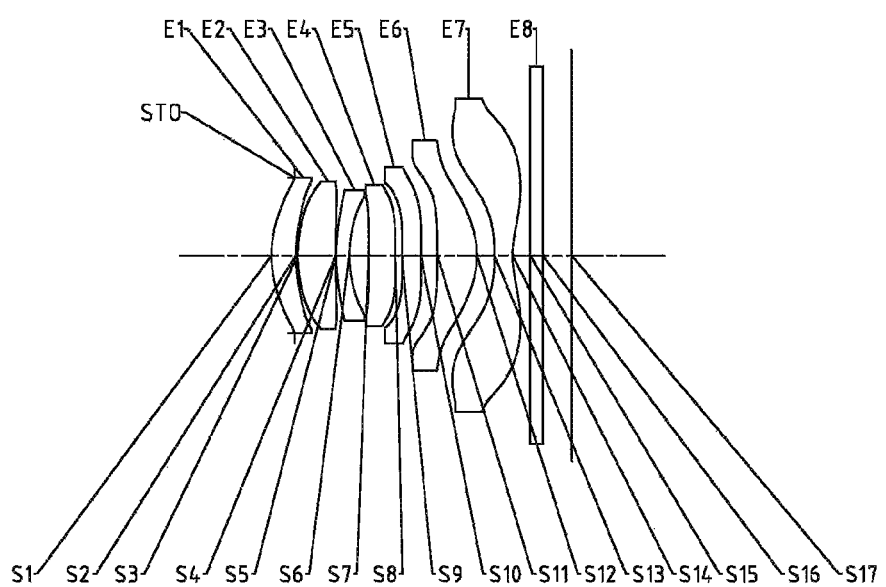
FIG. 15 is a schematic structural diagram illustrating a camera lens group according to Embodiment 8 of the present disclosure.

A camera lens group according to Embodiment 8 of the present disclosure is described below with reference to FIGS. 15-16D. FIG. 15 is a schematic structural diagram illustrating the camera lens group according to Embodiment 8 of the present disclosure.

As shown in FIG. 15, the camera lens group sequentially includes a first lens E1, a second lens E2, a third lens E3, a fourth lens E4, a fifth lens E5, a sixth lens E6, a seventh lens E7 and an image plane S17 from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the camera lens group may further include an optical filter E8 having an object-side surface S15 and an image-side surface S16. Light from an object passes through the surfaces S1 to S16 sequentially and is finally imaged on the image plane S17.

Alternatively, the camera lens group may further include a diaphragm STO disposed between the object side and the first lens E1, to improve the imaging quality.

Table 22 shows the surface type, the radius of curvature, the thickness, the material and the conic coefficient of each lens of the camera lens group in Embodiment 8. The radius of curvature and the thickness are shown in millimeters (mm). Table 23 shows the high-order coefficients applicable to each aspheric surface in Embodiment 8. The surface type of each aspheric surface may be defined by the formula (1) given in the above Embodiment 1. Table 24 shows the effective focal lengths f1-f7 of the lenses, the total effective focal length f of the camera lens group, the total track length TTL and the half of the diagonal length ImgH of the effective pixel area on the image plane S17 in Embodiment 8.

TABLE 22

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.3851 | | | |
| S1 | aspheric | 1.9686 | 0.4065 | 1.55 | 56.1 | −0.1918 |
| S2 | aspheric | 2.8993 | 0.0300 | | | 0.7040 |
| S3 | aspheric | 2.5342 | 0.6336 | 1.55 | 56.1 | 0.5530 |
| S4 | aspheric | 18.7752 | 0.0037 | | | 76.8244 |
| S5 | aspheric | 2.9108 | 0.2200 | 1.67 | 20.4 | −5.2826 |
| S6 | aspheric | 1.9067 | 0.3216 | | | −0.5641 |
| S7 | aspheric | 60.5955 | 0.4444 | 1.55 | 56.1 | 71.3649 |
| S8 | aspheric | −63.4360 | 0.1093 | | | 99.0000 |
| S9 | aspheric | 13.8611 | 0.3148 | 1.67 | 20.4 | −74.8292 |
| S10 | aspheric | 12.9734 | 0.2740 | | | 62.0926 |
| S11 | aspheric | −37.6923 | 0.6582 | 1.55 | 56.1 | 99.0000 |
| S12 | aspheric | −1.3312 | 0.2910 | | | −5.8396 |
| S13 | aspheric | −3.5793 | 0.3000 | 1.54 | 55.7 | −1.3384 |
| S14 | aspheric | 1.4918 | 0.2924 | | | −9.3344 |
| S15 | spherical | infinite | 0.2100 | 1.52 | 64.2 | |
| S16 | spherical | infinite | 0.4794 | | | |
| S17 | spherical | infinite | | | | |

TABLE 23

| surface number | A4 | A6 | A8 | A10 | A12 | A14 | A16 | A18 | A20 |
|---|---|---|---|---|---|---|---|---|---|
| S1 | −1.3600E−02 | 8.5380E−03 | −9.3690E−02 | 2.1140E−01 | −2.8597E−01 | 2.4015E−01 | −1.1925E−01 | 3.1959E−02 | −3.5900E−03 |
| S2 | 6.6587E−02 | −2.9792E−01 | 2.5697E−01 | 1.7631E−01 | −5.8682E−01 | 6.2363E−01 | −3.5864E−01 | 1.0993E−01 | −1.4260E−02 |
| S3 | 9.5710E−02 | −2.4982E−01 | 6.2442E−02 | 7.5291E−01 | −1.6839E+00 | 1.9527E+00 | −1.3438E+00 | 5.1489E−01 | −8.4850E−02 |
| S4 | −1.0310E−02 | −5.7810E−02 | 1.5217E−01 | −2.7560E−01 | 4.8308E−01 | −6.7709E−01 | 6.1504E−01 | −3.0655E−01 | 6.1757E−02 |
| S5 | −7.0340E−02 | −1.0300E−02 | 2.2411E−01 | −5.6517E−01 | 1.1562E+00 | −1.6830E+00 | 1.5160E+00 | −7.4665E−01 | 1.5141E−01 |
| S6 | −7.1640E−02 | 6.0535E−02 | −1.6580E−02 | 2.7107E−02 | 9.5331E−02 | −3.6363E−01 | 4.8384E−01 | −2.8753E−01 | 6.4288E−02 |
| S7 | −4.7280E−02 | 9.1173E−02 | −5.0835E−01 | 1.4990E+00 | −3.0179E+00 | 4.0067E+00 | −3.3148E+00 | 1.5400E+00 | −3.0140E−01 |
| S8 | −1.6426E−01 | 2.4366E−01 | −5.5556E−01 | 1.0972E+00 | −2.0169E+00 | 2.5325E+00 | −1.8561E+00 | 7.1596E−01 | −1.1198E−01 |
| S9 | −2.6290E−01 | 4.3228E−01 | −1.2691E+00 | 3.3050E+00 | −5.9696E+00 | 6.6268E+00 | −4.2949E+00 | 1.4943E+00 | −2.1671E−01 |
| S10 | −2.0168E−01 | 2.3394E−01 | −5.1814E−01 | 1.0396E+00 | −1.4172E+00 | 1.1876E+00 | −5.8418E−01 | 1.5486E−01 | −1.7070E−02 |
| S11 | −5.2670E−02 | −3.8170E−02 | 2.7750E−03 | 6.2461E−02 | −7.7340E−02 | 3.5064E−02 | −4.0200E−03 | −1.1200E−03 | 2.3400E−04 |
| S12 | −3.7400E−02 | −6.1700E−02 | 8.9179E−02 | −6.9770E−02 | 4.1503E−02 | −1.5910E−02 | 3.5160E−03 | −4.1000E−04 | 1.8900E−05 |
| S13 | −1.5403E−01 | 4.7711E−02 | 5.4640E−03 | −1.2700E−03 | −1.7700E−03 | 7.9200E−04 | −1.4000E−04 | 1.2600E−05 | −4.5000E−07 |
| S14 | −1.5456E−01 | 1.2466E−01 | −7.9700E−02 | 3.6052E−02 | −1.1160E−02 | 2.2800E−03 | −2.9000E−04 | 2.1400E−05 | −6.8000E−07 |

TABLE 24

| parameter | f1 (mm) | f2 (mm) | f3 (mm) | f4 (mm) | f5 (mm) |
|---|---|---|---|---|---|
| value | 9.73 | 5.29 | −9.10 | 56.84 | −354.57 |
| parameter | f6 (mm) | f7 (mm) | f (mm) | TTL (mm) | ImgH (mm) |
| value | 2.51 | −1.92 | 4.05 | 4.99 | 3.41 |

Figure 16A:
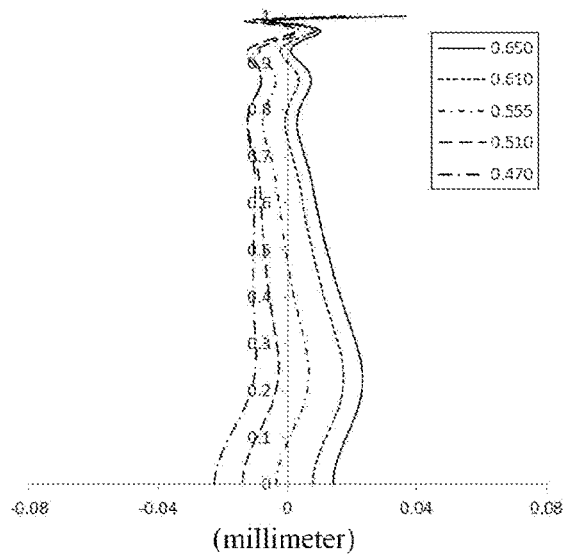
FIGS. 16A-16D respectively illustrate a longitudinal aberration curve, an astigmatic curve, a distortion curve and a lateral color curve of the camera lens group according to Embodiment 8.
Figure 16B:
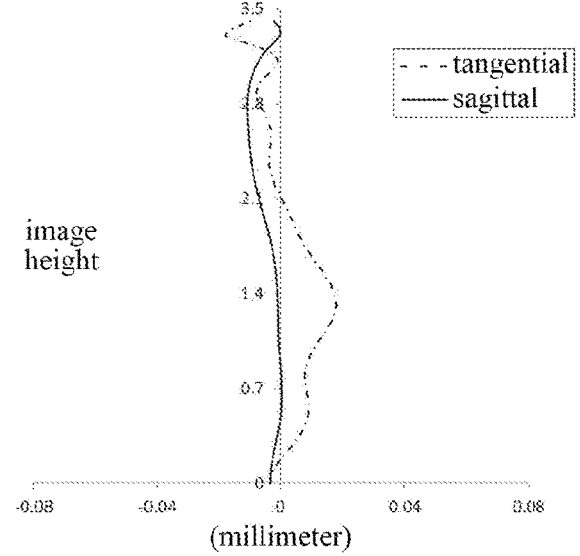
Figure 16C:
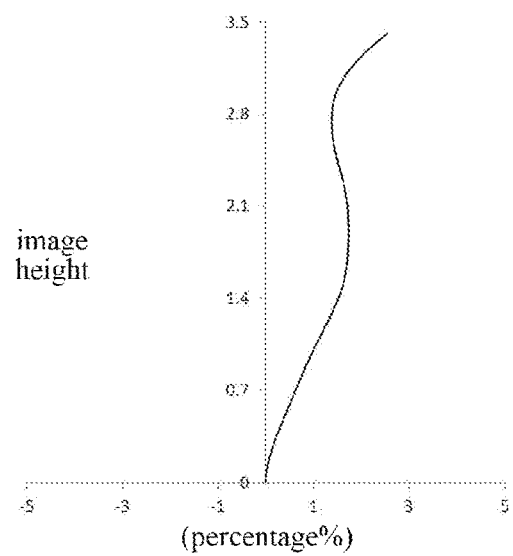
Figure 16D:
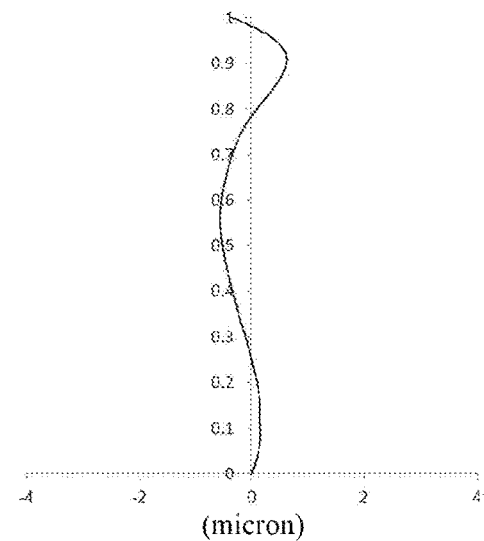

FIG. 16A shows the longitudinal aberration curve of the camera lens group according to Embodiment 8, representing deviations of focal points of light of different wavelengths converged after passing through the lens group. FIG. 16B shows the astigmatic curve of the camera lens group according to Embodiment 8, representing a curvature of the tangential image plane and a curvature of the sagittal image plane. FIG. 16C shows the distortion curve of the camera lens group according to Embodiment 8, representing amounts of distortion at different viewing angles. FIG. 16D shows the lateral color curve of the camera lens group according to Embodiment 8, representing deviations of different image heights on the image plane after light passes through the lens group. It can be seen from FIG. 16A to FIG. 16D that the camera lens group given in Embodiment 8 can achieve a good imaging quality.

Embodiment 9

A camera lens group according to Embodiment 9 of the present disclosure is described below with reference to FIGS. 17-18D. FIG. 17 is a schematic structural diagram illustrating the camera lens group according to Embodiment 9 of the present disclosure.

As shown in FIG. 17, the camera lens group sequentially includes a first lens E1, a second lens E2, a third lens E3, a fourth lens E4, a fifth lens E5, a sixth lens E6, a seventh lens E7 and an image plane S17 from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the camera lens group may further include an optical filter E8 having an object-side surface S15 and an image-side surface S16. Light from an object passes through the surfaces S1 to S16 sequentially and is finally imaged on the image plane S17.

Alternatively, the camera lens group may further include a diaphragm STO disposed between the object side and the first lens E1, to improve the imaging quality.

Table 25 shows the surface type, the radius of curvature, the thickness, the material and the conic coefficient of each lens of the camera lens group in Embodiment 9. The radius of curvature and the thickness are shown in millimeters (mm). Table 26 shows the high-order coefficients applicable to each aspheric surface in Embodiment 9. The surface type of each aspheric surface may be defined by the formula (1) given in the above Embodiment 1. Table 27 shows the effective focal lengths f1-f7 of the lenses, the total effective focal length f of the camera lens group, the total track length TTL and the half of the diagonal length ImgH of the effective pixel area on the image plane S17 in Embodiment 9.

TABLE 25

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3873 | | | |
| S1 | aspheric | 1.9538 | 0.3949 | 1.55 | 56.1 | −0.1976 |
| S2 | aspheric | 2.8006 | 0.0300 | | | 0.7215 |
| S3 | aspheric | 2.4922 | 0.6438 | 1.55 | 56.1 | 0.5626 |
| S4 | aspheric | 16.6762 | 0.0037 | | | 15.9991 |
| S5 | aspheric | 2.8971 | 0.2200 | 1.67 | 20.4 | −5.5656 |
| S6 | aspheric | 1.9349 | 0.3228 | | | −0.5543 |
| S7 | aspheric | 78.7675 | 0.4556 | 1.55 | 56.1 | −96.7229 |
| S8 | aspheric | −11.8606 | 0.1529 | | | −74.1882 |
| S9 | aspheric | −200.0000 | 0.3000 | 1.67 | 20.4 | −99.0000 |

TABLE 25-continued

| surface number | surface type | radius of curvature | thickness | material refractive index | abbe number | conic coefficient |
|---|---|---|---|---|---|---|
| S10 | aspheric | 16.5207 | 0.2439 | | | 73.8801 |
| S11 | aspheric | −35.4471 | 0.6345 | 1.55 | 56.1 | 99.0000 |
| S12 | aspheric | −1.3630 | 0.3058 | | | −6.3500 |
| S13 | aspheric | −3.7374 | 0.3000 | 1.54 | 55.7 | −1.2050 |
| S14 | aspheric | 1.5167 | 0.2921 | | | −9.8114 |
| S15 | spherical | infinite | 0.2100 | 1.52 | 64.2 | |
| S16 | spherical | infinite | 0.4791 | | | |
| S17 | spherical | infinite | | | | |

TABLE 26

| surface number | A4 | A6 | A8 | A10 | A12 | A14 | A16 | A18 | A20 |
|---|---|---|---|---|---|---|---|---|---|
| S1 | −1.5120E−02 | 1.3686E−02 | −1.0703E−01 | 2.3267E−01 | −3.0878E−01 | 2.5718E−01 | −1.2770E−01 | 3.4442E−02 | −3.9100E−03 |
| S2 | 6.0324E−02 | −2.4777E−01 | 1.2025E−01 | 3.8023E−01 | −7.8079E−01 | 7.4845E−01 | −4.1428E−01 | 1.2632E−01 | −1.6660E−02 |
| S3 | 8.8799E−02 | −1.9008E−01 | −1.1327E−01 | 1.0690E+00 | −2.0793E+00 | 2.2983E+00 | −1.5444E+00 | 5.8362E−01 | −9.5240E−02 |
| S4 | −1.3630E−02 | −4.4060E−02 | 1.1708E−01 | −2.2490E−01 | 4.4271E−01 | −6.6543E−01 | 6.1925E−01 | −3.0970E−01 | 6.2180E−02 |
| S5 | −6.7230E−02 | −1.5820E−02 | 2.3108E−01 | −6.3781E−01 | 1.4035E+00 | −2.0825E+00 | 1.8628E+00 | −9.0290E−01 | 1.8018E−01 |
| S6 | −6.5170E−02 | 3.6386E−02 | 5.7067E−02 | −1.8935E−01 | 5.3844E−01 | −9.2843E−01 | 9.1028E−01 | −4.6194E−01 | 9.4292E−02 |
| S7 | −4.2640E−02 | 8.7273E−02 | −5.6894E−01 | 1.8386E+00 | −3.8604E+00 | 5.1711E+00 | −4.2393E+00 | 1.9326E+00 | −3.6966E−01 |
| S8 | −6.5020E−02 | −1.7554E−01 | 7.5034E−01 | −1.8149E+00 | 2.5205E+00 | −2.1726E+00 | 1.1864E+00 | −3.8672E−01 | 5.8915E−02 |
| S9 | −1.9856E−01 | 2.2223E−01 | −8.7732E−01 | 2.7390E+00 | −5.1936E+00 | 5.7633E+00 | −3.6905E+00 | 1.2700E+00 | −1.8337E−01 |
| S10 | −1.8540E−01 | 1.5565E−01 | −4.3045E−01 | 1.0234E+00 | −1.4615E+00 | 1.2254E+00 | −5.9434E−01 | 1.5477E−01 | −1.6760E−02 |
| S11 | −1.7300E−02 | −1.4841E−01 | 1.5677E−01 | −7.6060E−02 | 3.7169E−02 | 6.3850E−03 | 1.4260E−03 | −1.5300E−03 | 2.3000E−04 |
| S12 | −2.4480E−02 | −8.4330E−02 | 1.1203E−01 | −8.7260E−02 | 5.1335E−02 | −1.9720E−02 | 4.4530E−03 | −5.4000E−04 | 2.6500E−05 |
| S13 | −1.4122E−01 | 2.6886E−02 | 2.1554E−02 | −8.8000E−03 | 4.9500E−04 | 3.4500E−04 | −8.7000E−05 | 8.5300E−06 | −3.2000E−07 |
| S14 | −1.4050E−01 | 1.0447E−01 | −6.3350E−02 | 2.7588E−02 | −8.2900E−03 | 1.6560E−03 | −2.1000E−04 | 1.4900E−05 | −4.6000E−07 |

TABLE 27

| parameter | f1 (mm) | f2 (mm) | f3 (mm) | f4 (mm) | f5 (mm) |
|---|---|---|---|---|---|
| value | 10.16 | 5.28 | −9.63 | 18.92 | −22.91 |
| parameter | f6 (mm) | f7 (mm) | f (mm) | TTL (mm) | ImgH (mm) |
| value | 2.58 | −1.97 | 4.06 | 4.99 | 3.41 |

Figure 18C:
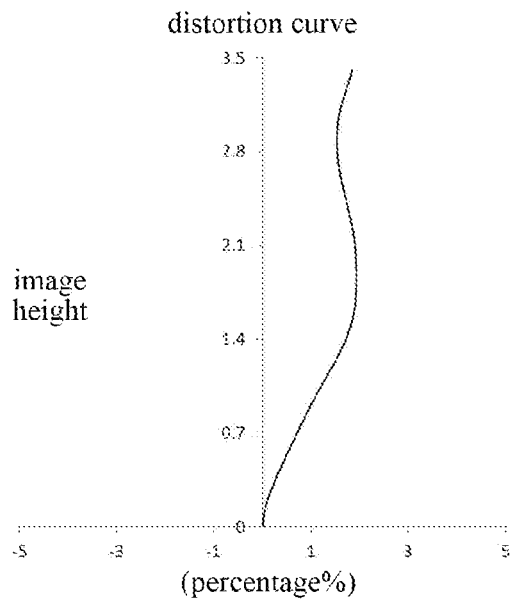
Figure 18D:
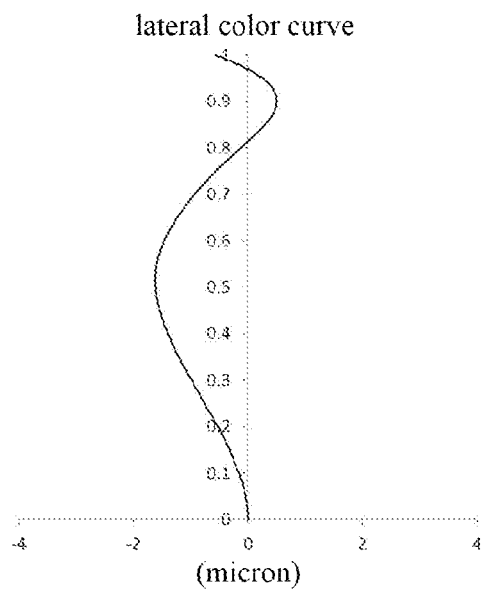

FIG. 18A shows the longitudinal aberration curve of the camera lens group according to Embodiment 9, representing deviations of focal points of light of different wavelengths converged after passing through the lens group. FIG. 18B shows the astigmatic curve of the camera lens group according to Embodiment 9, representing a curvature of the tangential image plane and a curvature of the sagittal image plane. FIG. 18C shows the distortion curve of the camera lens group according to Embodiment 9, representing amounts of distortion at different viewing angles. FIG. 18D shows the lateral color curve of the camera lens group according to Embodiment 9, representing deviations of different image heights on the image plane after light passes through the lens group. It can be seen from FIG. 18A to FIG. 18D that the camera lens group given in Embodiment 9 can achieve a good imaging quality.

Embodiment 10

Figure 19:
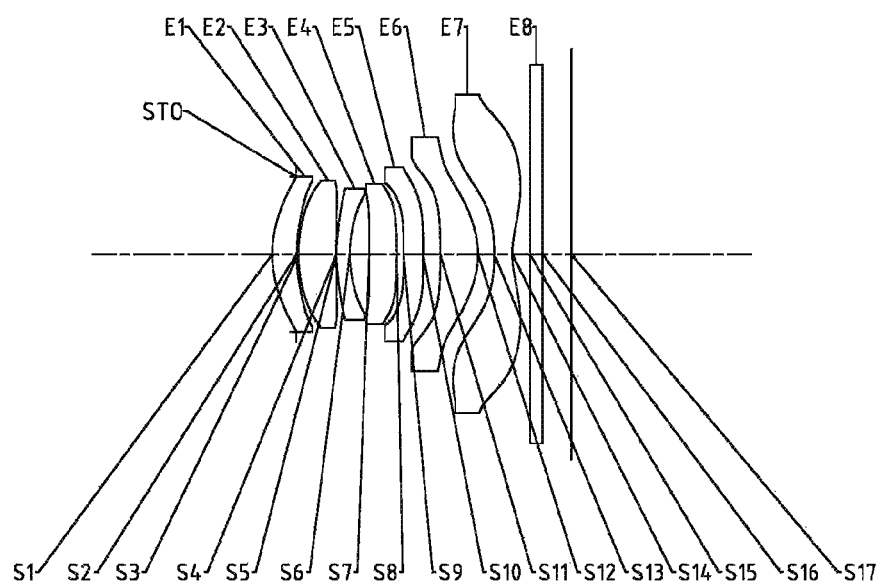
FIG. 19 is a schematic structural diagram illustrating a camera lens group according to Embodiment 10 of the present disclosure.

A camera lens group according to Embodiment 10 of the present disclosure is described below with reference to FIGS. 19-20D. FIG. 19 is a schematic structural diagram illustrating the camera lens group according to Embodiment 10 of the present disclosure.

As shown in FIG. 19, the camera lens group sequentially includes a first lens E1, a second lens E2, a third lens E3, a fourth lens E4, a fifth lens E5, a sixth lens E6, a seventh lens E7 and an image plane S17 from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a positive refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a concave surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the camera lens group may further include an optical filter E8 having an object-side surface S15 and an image-side surface S16. Light from an object passes through the surfaces S1 to S16 sequentially and is finally imaged on the image plane S17.

Alternatively, the camera lens group may further include a diaphragm STO disposed between the object side and the first lens E1, to improve the imaging quality.

Table 28 shows the surface type, the radius of curvature, the thickness, the material and the conic coefficient of each lens of the camera lens group in Embodiment 10. The radius of curvature and the thickness are shown in millimeters (mm). Table 29 shows the high-order coefficients applicable to each aspheric surface in Embodiment 10. The surface type of each aspheric surface may be defined by the formula (1) given in the above Embodiment 1. Table 30 shows the effective focal lengths f1-f7 of the lenses, the total effective focal length f of the camera lens group, the total track length TTL and the half of the diagonal length ImgH of the effective pixel area on the image plane S17 in Embodiment 10.

TABLE 28

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.3979 | | | |
| S1 | aspheric | 1.9424 | 0.4064 | 1.55 | 56.1 | −0.1723 |
| S2 | aspheric | 2.8560 | 0.0300 | | | 0.8697 |
| S3 | aspheric | 2.5465 | 0.6322 | 1.55 | 56.1 | 0.4617 |
| S4 | aspheric | 22.0059 | 0.0037 | | | 79.3818 |
| S5 | aspheric | 2.9987 | 0.2200 | 1.67 | 20.4 | −5.2782 |
| S6 | aspheric | 1.9408 | 0.3246 | | | −0.6319 |
| S7 | aspheric | 69.0789 | 0.4588 | 1.55 | 56.1 | 99.0000 |
| S8 | aspheric | −20.3471 | 0.1145 | | | 99.0000 |
| S9 | aspheric | −321.3460 | 0.3260 | 1.67 | 20.4 | −99.0000 |
| S10 | aspheric | −200.0000 | 0.2864 | | | −99.0000 |
| S11 | aspheric | −14.7433 | 0.6310 | 1.55 | 56.1 | 22.0392 |
| S12 | aspheric | −1.3178 | 0.2695 | | | −6.4678 |
| S13 | aspheric | −3.6907 | 0.3000 | 1.54 | 55.7 | −1.2121 |
| S14 | aspheric | 1.4293 | 0.2944 | | | −9.7541 |
| S15 | spherical | infinite | 0.2100 | 1.52 | 64.2 | |
| S16 | spherical | infinite | 0.4814 | | | |
| S17 | spherical | infinite | | | | |

TABLE 29

| surface number | A4 | A6 | A8 | A10 | A12 | A14 | A16 | A18 | A20 |
|---|---|---|---|---|---|---|---|---|---|
| S1 | −1.4730E−02 | 1.5000E−02 | −1.1378E−01 | 2.5426E−01 | −3.4242E−01 | 2.8615E−01 | −1.4226E−01 | 3.8570E−02 | −4.4300E−03 |
| S2 | 6.0695E−02 | −2.4972E−01 | 1.2802E−01 | 3.8980E−01 | −8.4068E−01 | 8.3699E−01 | −4.7758E−01 | 1.4989E−01 | −2.0440E−02 |
| S3 | 8.8764E−02 | −1.7955E−01 | −1.7731E−01 | 1.2875E+00 | −2.5081E+00 | 2.7890E+00 | −1.8724E+00 | 7.0357E−01 | −1.1400E−01 |
| S4 | −1.7680E−02 | 3.4322E−02 | −1.6630E−01 | 3.6125E−01 | −3.6502E−01 | 7.9004E−02 | 1.8025E−01 | −1.6037E−01 | 3.9976E−02 |
| S5 | −8.3570E−02 | 7.3683E−02 | −7.9200E−03 | −2.3619E−01 | 9.5287E−01 | −1.7513E+00 | 1.7192E+00 | −8.7280E−01 | 1.7866E−01 |
| S6 | −7.5710E−02 | 5.8420E−02 | 5.2774E−02 | −2.2977E−01 | 5.6085E−01 | −8.2545E−01 | 7.1625E−01 | −3.2350E−01 | 5.7552E−02 |
| S7 | −4.9660E−02 | 1.0493E−01 | −6.0655E−01 | 1.9140E+00 | −4.0198E+00 | 5.4316E+00 | −4.5026E+00 | 2.0735E+00 | −4.0010E−01 |
| S8 | −1.0744E−01 | −1.5110E−02 | 2.0775E−01 | −5.4246E−01 | 5.5456E−01 | −2.5470E−01 | 6.7922E−02 | −3.5160E−02 | 1.3694E−02 |
| S9 | −1.7438E−01 | 5.3936E−02 | −1.3800E−01 | 7.6105E−01 | −1.9625E+00 | 2.4863E+00 | −1.6618E+00 | 5.6525E−01 | −7.8020E−02 |
| S10 | −1.1806E−01 | −1.4840E−01 | 2.9528E−02 | 1.7678E−01 | −4.7005E−01 | 5.0210E−01 | −2.7681E−01 | 7.8030E−02 | −8.9100E−03 |
| S11 | −1.3950E−02 | −1.0608E−01 | 5.1835E−02 | 5.1356E−02 | −8.8610E−02 | 4.9653E−02 | −1.2090E−02 | 1.0520E−03 | 9.2000E−06 |
| S12 | −3.5810E−02 | −5.7740E−02 | 6.4368E−02 | −4.3730E−02 | 3.1422E−02 | −1.5360E−02 | 4.1860E−03 | −5.9000E−04 | 3.3400E−05 |
| S13 | −1.4328E−01 | 8.1050E−03 | 4.8625E−02 | −2.4470E−02 | 5.5240E−03 | −6.3000E−04 | 2.8700E−05 | 7.5500E−07 | −8.8000E−08 |
| S14 | −1.4171E−01 | 1.0172E−01 | −5.8800E−02 | 2.4817E−02 | −7.3600E−03 | 1.4640E−03 | −1.8000E−04 | 1.3300E−05 | −4.2000E−07 |

TABLE 30

| parameter | f1 (mm) | f2 (mm) | f3 (mm) | f4 (mm) | f5 (mm) |
|---|---|---|---|---|---|
| value | 9.61 | 5.22 | −9.01 | 28.84 | 794.72 |
| parameter | f6 (mm) | f7 (mm) | f (mm) | TTL (mm) | ImgH (mm) |
| value | 2.61 | −1.88 | 4.06 | 4.99 | 3.41 |

Figure 20A:
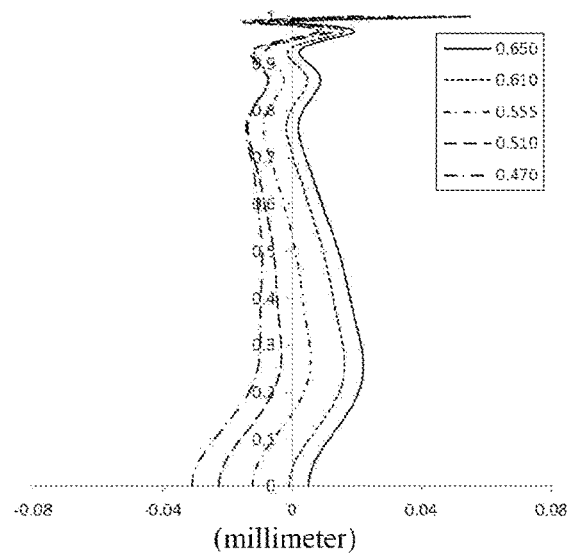
FIGS. 20A-20D respectively illustrate a longitudinal aberration curve, an astigmatic curve, a distortion curve and a lateral color curve of the camera lens group according to Embodiment 10.
Figure 20B:
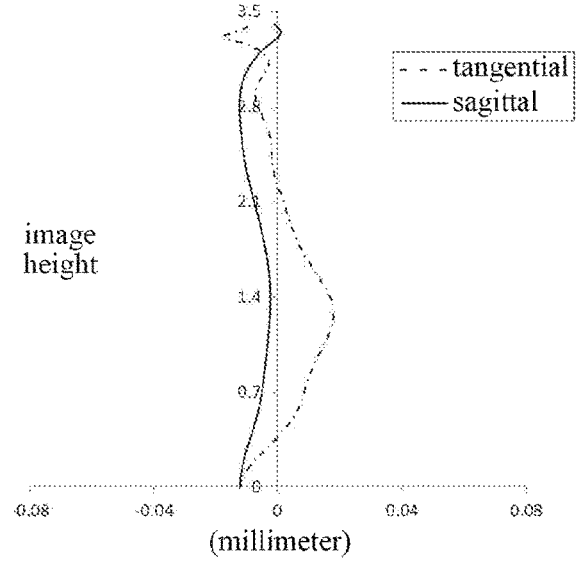
Figure 20C:
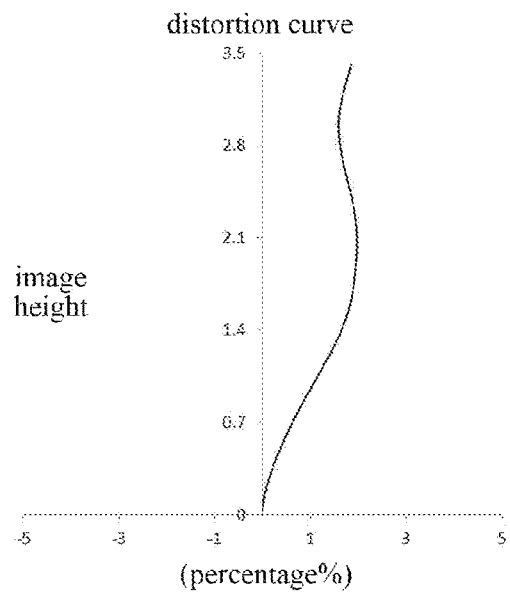
Figure 20D:
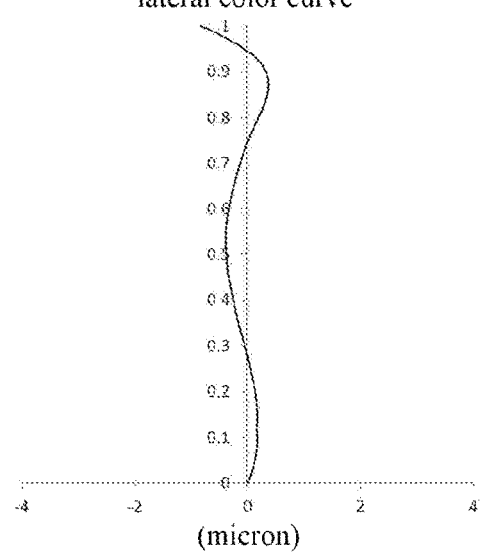

FIG. 20A shows the longitudinal aberration curve of the camera lens group according to Embodiment 10, representing deviations of focal points of light of different wavelengths converged after passing through the lens group. FIG. 20B shows the astigmatic curve of the camera lens group according to Embodiment 10, representing a curvature of the tangential image plane and a curvature of the sagittal image plane. FIG. 20C shows the distortion curve of the camera lens group according to Embodiment 10, representing amounts of distortion at different viewing angles. FIG. 20D shows the lateral color curve of the camera lens group according to Embodiment 10, representing deviations of different image heights on the image plane after light passes through the lens group. It can be seen from FIG. 20A to FIG. 20D that the camera lens group given in Embodiment 10 can achieve a good imaging quality.

Embodiment 11

Figure 21:
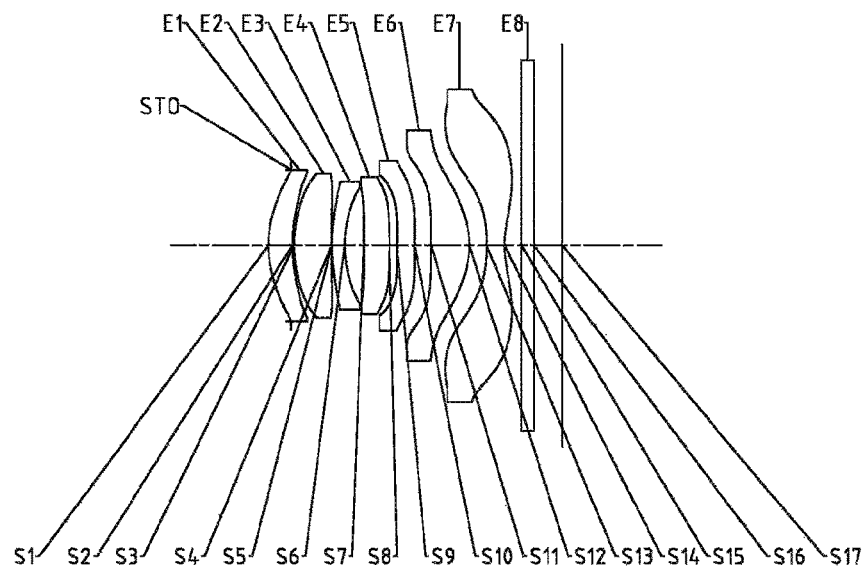
FIG. 21 is a schematic structural diagram illustrating a camera lens group according to Embodiment 11 of the present disclosure.

A camera lens group according to Embodiment 11 of the present disclosure is described below with reference to FIGS. 21-22D. FIG. 21 is a schematic structural diagram illustrating the camera lens group according to Embodiment 11 of the present disclosure.

As shown in FIG. 21, the camera lens group sequentially includes a first lens E1, a second lens E2, a third lens E3, a fourth lens E4, a fifth lens E5, a sixth lens E6, a seventh lens E7 and an image plane S17 from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the camera lens group may further include an optical filter E8 having an object-side surface S15 and an image-side surface S16. Light from an object passes through the surfaces S1 to S16 sequentially and is finally imaged on the image plane S17.

Alternatively, the camera lens group may further include a diaphragm STO disposed between the object side and the first lens E1, to improve the imaging quality.

Table 31 shows the surface type, the radius of curvature, the thickness, the material and the conic coefficient of each lens of the camera lens group in Embodiment 11. The radius of curvature and the thickness are shown in millimeters (mm). Table 32 shows the high-order coefficients applicable to each aspheric surface in Embodiment 11. The surface type of each aspheric surface may be defined by the formula (1) given in the above Embodiment 1. Table 33 shows the effective focal lengths f1-f7 of the lenses, the total effective focal length f of the camera lens group, the total track length TTL and the half of the diagonal length ImgH of the effective pixel area on the image plane S17 in Embodiment 11.

TABLE 31

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3851 | | | |
| S1 | aspheric | 1.9726 | 0.4063 | 1.55 | 56.1 | −0.2165 |
| S2 | aspheric | 2.9438 | 0.0300 | | | 0.6620 |
| S3 | aspheric | 2.5625 | 0.6345 | 1.55 | 56.1 | 0.5241 |
| S4 | aspheric | 19.8517 | 0.0037 | | | 11.8591 |
| S5 | aspheric | 3.0023 | 0.2200 | 1.67 | 20.4 | −5.1625 |
| S6 | aspheric | 1.9438 | 0.3221 | | | −0.4957 |
| S7 | aspheric | 62.5109 | 0.4339 | 1.55 | 56.1 | 99.0000 |
| S8 | aspheric | −30.1801 | 0.1265 | | | 99.0000 |
| S9 | aspheric | 18.1132 | 0.3000 | 1.67 | 20.4 | 35.1183 |
| S10 | aspheric | 12.2680 | 0.2884 | | | 60.2527 |
| S11 | aspheric | 200.0000 | 0.6500 | 1.55 | 56.1 | −99.0000 |
| S12 | aspheric | −1.4225 | 0.2942 | | | −6.4531 |
| S13 | aspheric | −3.6404 | 0.3000 | 1.54 | 55.7 | −1.2160 |
| S14 | aspheric | 1.5466 | 0.2912 | | | −10.1267 |
| S15 | spherical | infinite | 0.2100 | 1.52 | 64.2 | |
| S16 | spherical | infinite | 0.4782 | | | |
| S17 | spherical | infinite | | | | |

TABLE 32

| surface number | A4 | A6 | A8 | A10 | A12 | A14 | A16 | A18 | A20 |
|---|---|---|---|---|---|---|---|---|---|
| S1 | −1.5120E−02 | 1.4769E−02 | −1.0973E−01 | 2.3983E−01 | −3.2099E−01 | 2.6769E−01 | −1.3255E−01 | 3.5566E−02 | −4.0100E−03 |
| S2 | 5.5236E−02 | −2.4134E−01 | 1.3518E−01 | 3.4134E−01 | −7.4216E−01 | 7.1968E−01 | −3.9273E−01 | 1.1510E−01 | −1.4260E−02 |
| S3 | 8.3019E−02 | −1.8515E−01 | −1.1306E−01 | 1.0916E+00 | −2.1564E+00 | 2.3932E+00 | −1.5977E+00 | 5.9618E−01 | −9.5860E−02 |
| S4 | −2.4170E−02 | 6.2340E−03 | −3.6530E−02 | 7.0512E−02 | 8.7395E−02 | −4.0142E−01 | 5.0779E−01 | −2.8741E−01 | 6.0963E−02 |
| S5 | −7.9210E−02 | 3.6325E−02 | 9.4232E−02 | −3.6369E−01 | 1.0025E+00 | −1.6718E+00 | 1.5906E+00 | −7.9904E−01 | 1.6278E−01 |
| S6 | −6.7640E−02 | 4.9656E−02 | 2.4953E−02 | −9.5940E−02 | 3.2664E−01 | −6.3902E−01 | 6.8625E−01 | −3.7025E−01 | 7.8134E−02 |
| S7 | −4.4790E−02 | 9.7092E−02 | −5.9921E−01 | 1.9060E+00 | −4.0045E+00 | 5.4293E+00 | −4.5360E+00 | 2.1194E+00 | −4.1891E−01 |
| S8 | −1.1430E−01 | 7.3499E−02 | 9.8110E−03 | −3.7535E−01 | 6.9303E−01 | −7.0789E−01 | 4.9477E−01 | −2.1894E−01 | 4.4149E−02 |
| S9 | −2.3145E−01 | 2.3865E−01 | −5.2957E−01 | 1.3171E+00 | −2.4717E+00 | 2.7737E+00 | −1.7602E+00 | 5.8868E−01 | −8.2190E−02 |
| S10 | −2.0240E−01 | 1.7815E−01 | −3.6077E−01 | 7.3810E−01 | −1.0343E+00 | 8.8344E−01 | −4.3853E−01 | 1.1637E−01 | −1.2760E−02 |
| S11 | −4.5970E−02 | −4.8620E−02 | 1.0247E−02 | 4.6805E−02 | −6.2560E−02 | 3.3227E−02 | −7.5200E−03 | 4.8000E−04 | 3.2400E−05 |
| S12 | −2.7140E−02 | −6.2110E−02 | 8.1130E−02 | −6.4970E−02 | 4.0140E−02 | −1.5680E−02 | 3.5090E−03 | −4.1000E−04 | 1.9700E−05 |
| S13 | −1.4605E−01 | 3.3547E−02 | 1.4965E−02 | −4.5900E−03 | −1.0800E−03 | 6.9800E−04 | −1.3000E−04 | 1.1900E−05 | −4.2000E−07 |
| S14 | −1.3393E−01 | 9.4662E−02 | −5.5170E−02 | 2.3593E−02 | −7.0800E−03 | 1.4210E−03 | −1.8000E−04 | 1.3100E−05 | −4.1000E−07 |

TABLE 33

| parameter | f1 (mm) | f2 (mm) | f3 (mm) | f4 (mm) | f5 (mm) |
|---|---|---|---|---|---|
| value | 9.54 | 5.32 | −9.03 | 37.34 | −58.30 |
| parameter | f6 (mm) | f7 (mm) | f (mm) | TTL (mm) | ImgH (mm) |
| value | 2.59 | −1.98 | 4.07 | 4.99 | 3.41 |

Figures 22A, 22B:
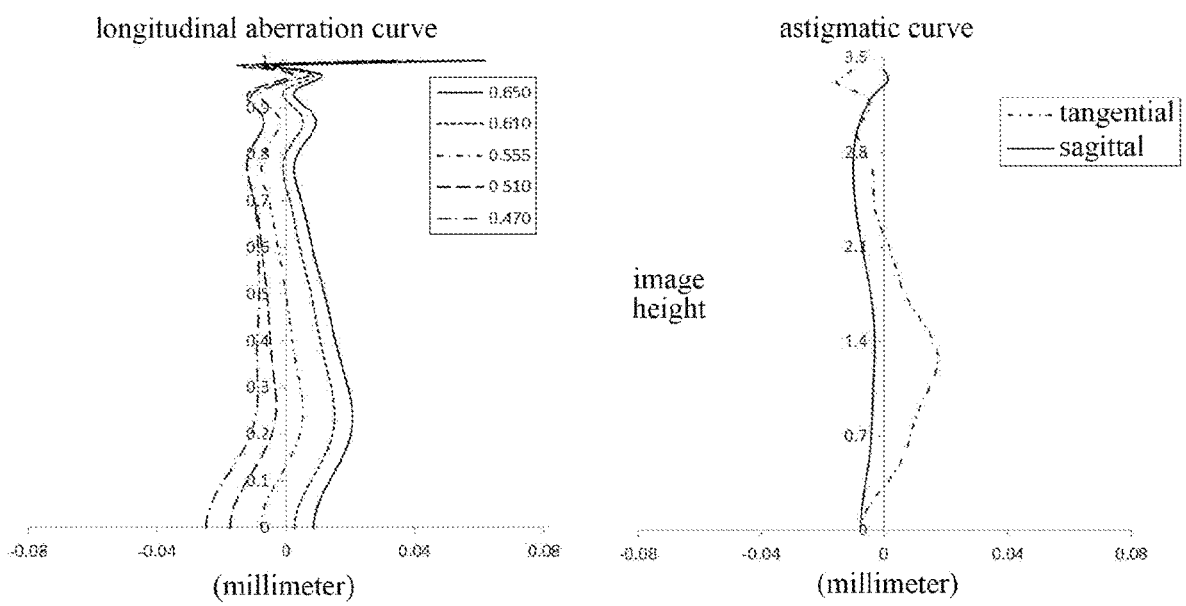
FIGS. 22A-22D respectively illustrate a longitudinal aberration curve, an astigmatic curve, a distortion curve and a lateral color curve of the camera lens group according to Embodiment 11.
Figure 22C:
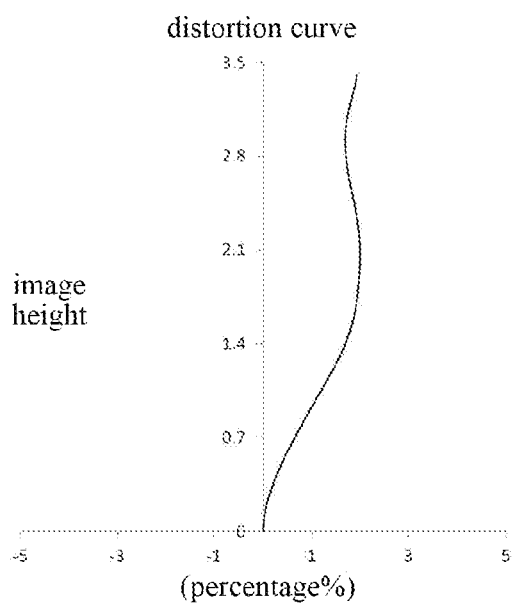
Figure 22D:
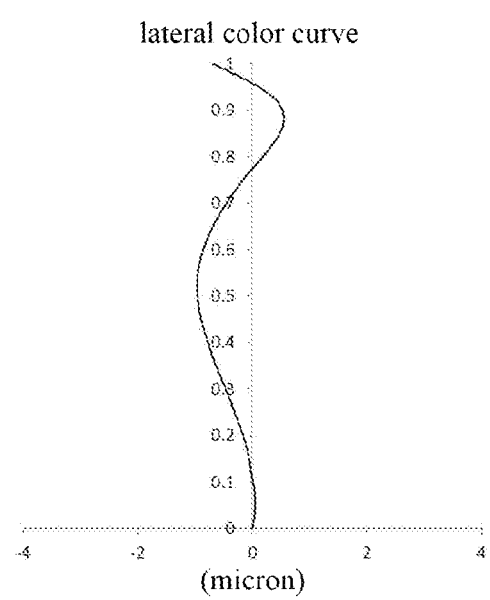

FIG. 22A shows the longitudinal aberration curve of the camera lens group according to Embodiment 11, representing deviations of focal points of light of different wavelengths converged after passing through the lens group. FIG. 22B shows the astigmatic curve of the camera lens group according to Embodiment 11, representing a curvature of the tangential image plane and a curvature of the sagittal image plane. FIG. 22C shows the distortion curve of the camera lens group according to Embodiment 11, representing amounts of distortion at different viewing angles. FIG. 22D shows the lateral color curve of the camera lens group according to Embodiment 11, representing deviations of different image heights on the image plane after light passes through the lens group. It can be seen from FIG. 22A to FIG. 22D that the camera lens group given in Embodiment 11 can achieve a good imaging quality.

To sum up, Embodiment 1 to Embodiment 11 respectively satisfy the relationships shown in Table 34 below.

TABLE 34

| conditional expression | embodiment | | | | | | | | | | |
|---|---|---|---|---|---|---|---|---|---|---|---|
|  | 1 | 2 | 3 | 4 | 5 | 6 | 7 | 8 | 9 | 10 | 11 |
| f/EPD | 1.59 | 1.59 | 1.59 | 1.59 | 1.58 | 1.58 | 1.57 | 1.57 | 1.58 | 1.58 | 1.58 |
| f2/f6 | 2.08 | 2.03 | 2.43 | 2.09 | 2.00 | 2.00 | 2.15 | 2.11 | 2.05 | 2.00 | 2.05 |
| f6/CT6 | 3.29 | 3.31 | 3.51 | 3.74 | 4.17 | 4.23 | 4.06 | 3.82 | 4.07 | 4.13 | 3.98 |
| f2/f7 | −2.53 | −2.49 | −3.01 | −2.60 | −2.75 | −2.76 | −2.75 | −2.75 | −2.68 | −2.77 | −2.68 |
| (CT1 + CT2 + CT6)/CT1 | 4.21 | 4.23 | 3.78 | 3.99 | 4.17 | 4.21 | 3.83 | 4.18 | 4.24 | 4.11 | 4.16 |
| f/f7 | −2.14 | −2.15 | −2.10 | −2.06 | −2.10 | −2.09 | −2.09 | −2.11 | −2.06 | −2.16 | −2.05 |
| f2/f3 | −0.62 | −0.61 | −0.65 | −0.65 | −0.66 | −0.58 | −0.62 | −0.58 | −0.55 | −0.58 | −0.59 |
| CT6 (mm) | 0.69 | 0.70 | 0.68 | 0.66 | 0.64 | 0.64 | 0.62 | 0.66 | 0.63 | 0.63 | 0.65 |
| R12/R13 | 0.36 | 0.36 | 0.38 | 0.35 | 0.39 | 0.39 | 0.32 | 0.37 | 0.36 | 0.36 | 0.39 |
| CT1/CT2 | 0.66 | 0.65 | 0.78 | 0.69 | 0.63 | 0.62 | 0.71 | 0.64 | 0.61 | 0.64 | 0.64 |
| |f1/f5| | 0.09 | 0.05 | 0.09 | 0.02 | 0.06 | 0.09 | 0.03 | 0.03 | 0.44 | 0.01 | 0.16 |

The present disclosure further provides a camera device, having a photosensitive element which may be a photosensitive charge-coupled device (CCD) or a complementary metal-oxide semiconductor (CMOS) element. The camera device may be an independent camera device such as a digital camera, or may be a camera module integrated in a mobile electronic device such as a mobile phone. The camera device is equipped with the camera lens group described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar function.

What is claimed is:

1. A camera lens group sequentially comprising, from an object side to an image side along an optical axis: a first lens, a second lens, a third lens, a fourth lens, a fifth lens, a sixth lens and a seventh lens,
    wherein the first lens has a positive refractive power, and an object-side surface of the first lens is a convex surface;
    the second lens has a positive refractive power, and an object-side surface of the second lens is a convex surface;
    the third lens has a refractive power, and an image-side surface of the third lens is a concave surface;

the fourth lens has a refractive power;
the fifth lens has a refractive power;
the sixth lens has a positive refractive power, and an image-side surface of the sixth lens is a convex surface;
the seventh lens has a negative refractive power, and both an object-side surface and an image-side surface of the seventh lens are concave surfaces; and
a total effective focal length f of the camera lens group and an entrance pupil diameter EPD of the camera lens group satisfy: f/EPD≤1.60, and
wherein an effective focal length f2 of the second lens and an effective focal length f6 of the sixth lens satisfy: 2≤f2/f6<3.

2. The camera lens group according to claim 1, wherein the total effective focal length f of the camera lens group and an effective focal length f7 of the seventh lens satisfy: −3<f/f7≤−2.

3. The camera lens group according to claim 1, wherein an effective focal length f2 of the second lens and the effective focal length f7 of the seventh lens satisfy: −3.5<f2/f7<−2.0.

4. The camera lens group according to claim 1, wherein the third lens has a negative refractive power, and an effective focal length f2 of the second lens and an effective focal length f3 of the third lens satisfy: −1<f2/f3≤−0.5.

5. The camera lens group according to claim 1, wherein an effective focal length f1 of the first lens and an effective focal length f5 of the fifth lens satisfy: |f1/f5|≤0.5.

6. The camera lens group according to claim 1, wherein a center thickness CT6 of the sixth lens on the optical axis satisfies: 0.5 mm<CT6<1.0 mm.

7. The camera lens group according to claim 1, wherein a center thickness CT1 of the first lens on the optical axis and a center thickness CT2 of the second lens on the optical axis satisfy: 0.5<CT1/CT2<1.

8. The camera lens group according to claim 1, wherein the effective focal length f6 of the sixth lens and the center thickness CT6 of the sixth lens on the optical axis satisfy: 3.0<f6/CT6<4.5.

9. The camera lens group according to claim 1, wherein the center thickness CT1 of the first lens on the optical axis, the center thickness CT2 of the second lens on the optical axis, and the center thickness CT6 of the sixth lens on the optical axis satisfy: 3<(CT1+CT2+CT6)/CT1<5.

10. The camera lens group according to claim 1, wherein a radius of curvature R12 of the image-side surface of the sixth lens and a radius of curvature R13 of the object-side surface of the seventh lens satisfy: 0<R12/R13<0.5.

11. A camera lens group sequentially comprising, from an object side to an image side along an optical axis: a first lens, a second lens, a third lens, a fourth lens, a fifth lens, a sixth lens and a seventh lens,
wherein the first lens has a positive refractive power, and an object-side surface of the first lens is a convex surface;
the second lens has a positive refractive power, and at least one of an object-side surface or an image-side surface of the second lens is a convex surface;
the third lens has a refractive power, and an image-side surface of the third lens is a concave surface;
at least one of the fourth lens or the fifth lens has a positive refractive power;
the sixth lens has a positive refractive power, and an image-side surface of the sixth lens is a convex surface;
the seventh lens has a negative refractive power, and both an object-side surface and an image-side surface of the seventh lens are concave surfaces; and
a center thickness CT1 of the first lens on the optical axis and a center thickness CT2 of the second lens on the optical axis satisfy: 0.5<CT1/CT2<1,
wherein an effective focal length f6 of the sixth lens and the center thickness CT6 of the sixth lens on the optical axis satisfy: 3.0<f6/CT6<4.5.

12. The camera lens group according to claim 11, wherein a center thickness CT6 of the sixth lens on the optical axis satisfies: 0.5 mm<CT6<1.0 mm.

13. The camera lens group according to claim 12, wherein the center thickness CT1 of the first lens on the optical axis, the center thickness CT2 of the second lens on the optical axis, and the center thickness CT6 of the sixth lens on the optical axis satisfy: 3<(CT1+CT2+CT6)/CT1<5.

14. The camera lens group according to claim 11, wherein an effective focal length f2 of the second lens and the effective focal length f6 of the sixth lens satisfy: 2≤f2/f6<3.

15. The camera lens group according to claim 14, wherein the third lens has a negative refractive power, and the effective focal length f2 of the second lens and an effective focal length f3 of the third lens satisfy: −1<f2/f3≤−0.5.

16. The camera lens group according to claim 14, wherein the effective focal length f2 of the second lens and an effective focal length f7 of the seventh lens satisfy: −3.5<f2/f7<−2.0.

17. The camera lens group according to claim 16, wherein a total effective focal length f of the camera lens group and the effective focal length f7 of the seventh lens satisfy: −3<f/f7≤−2.

18. A camera lens group sequentially comprising, from an object side to an image side along an optical axis: a first lens, a second lens, a third lens, a fourth lens, a fifth lens, a sixth lens and a seventh lens,
wherein the first lens has a positive refractive power, and an object-side surface of the first lens is a convex surface;
the second lens has a positive refractive power, and at least one of an object-side surface or an image-side surface of the second lens is a convex surface;
the third lens has a refractive power, and an image-side surface of the third lens is a concave surface;
at least one of the fourth lens or the fifth lens has a positive refractive power;
the sixth lens has a positive refractive power, and an image-side surface of the sixth lens is a convex surface;
the seventh lens has a negative refractive power, and both an object-side surface and an image-side surface of the seventh lens are concave surfaces; and
a center thickness CT1 of the first lens on the optical axis and a center thickness CT2 of the second lens on the optical axis satisfy: 0.5<CT1/CT2<1, and
wherein a radius of curvature R12 of the image-side surface of the sixth lens and a radius of curvature R13 of the object-side surface of the seventh lens satisfy: 0<R12/R13<0.5.

* * * * *